(12) United States Patent
Suzuki

(10) Patent No.: US 9,758,327 B2
(45) Date of Patent: Sep. 12, 2017

(54) ROTATION DETECTING UNIT, SHEET FEEDING DEVICE AND IMAGE FORMING APPARATUS

(71) Applicant: CANON KABUSHIKI KAISHA, Tokyo (JP)

(72) Inventor: Masato Suzuki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/256,999

(22) Filed: Sep. 6, 2016

(65) Prior Publication Data

US 2017/0075280 A1    Mar. 16, 2017

(30) Foreign Application Priority Data

Sep. 11, 2015  (JP) ................. 2015-180045

(51) Int. Cl.
*B65H 7/14* (2006.01)
*B65H 1/04* (2006.01)
*B65H 1/08* (2006.01)
*B65H 3/06* (2006.01)

(52) U.S. Cl.
CPC ............. *B65H 7/14* (2013.01); *B65H 1/04* (2013.01); *B65H 1/08* (2013.01); *B65H 3/0607* (2013.01); *B65H 3/0661* (2013.01); *B65H 2553/412* (2013.01); *B65H 2553/51* (2013.01)

(58) Field of Classification Search
CPC .......... B65H 1/04; B65H 1/08; B65H 3/0661; B65H 7/14; B65H 3/0607; B65H 2553/51; B65H 2553/412; B65H 7/20; B65H 43/08; G01D 5/3473; G01P 3/486
See application file for complete search history.

(56) References Cited

U.S. PATENT DOCUMENTS

| | | | | |
|---|---|---|---|---|
| 3,757,128 A | * | 9/1973 | Vermeulen | G01P 3/486 250/231.16 |
| 3,814,934 A | * | 6/1974 | Mesh | G01D 5/36 250/231.16 |
| 5,017,776 A | * | 5/1991 | Loewen | H03M 1/301 250/231.14 |

(Continued)

FOREIGN PATENT DOCUMENTS

JP   2007-98831 A   4/2007

*Primary Examiner* — David H Bollinger
(74) *Attorney, Agent, or Firm* — Fitzpatrick, Cella, Harper & Scinto

(57) ABSTRACT

A rotation detecting unit includes a light emitting device, a light receiving device, an output device, a rotatable plate, and a discriminating device. The rotatable plate includes a first portion and a second portion which are alternately provided along a circumferential direction, a third portion provided between the first portion and the second portion, and a fourth portion provided between the second portion and the first portion. When a region of the first portion is irradiated with light emitted from the light emitting device and received by the light receiving device, received light quantity of the light receiving device is a maximum. When a region of the second portion is irradiated with the light, the received light quantity is a minimum. When the third or fourth portion is irradiated with the light, the received light quantity is larger than the minimum and is smaller than the maximum.

18 Claims, 15 Drawing Sheets

(56) References Cited

U.S. PATENT DOCUMENTS

| | | | | |
|---|---|---|---|---|
| 5,970,274 | A * | 10/1999 | Rath ........................ | B65H 7/06 |
| | | | | 271/258.03 |
| 2011/0101596 | A1* | 5/2011 | Lee ......................... | B65H 7/18 |
| | | | | 271/3.16 |
| 2013/0015285 | A1* | 1/2013 | Uruma .................. | B65H 18/103 |
| | | | | 242/420.5 |
| 2014/0277730 | A1* | 9/2014 | Nakamura ............. | B25J 13/088 |
| | | | | 700/258 |
| 2015/0175374 | A1* | 6/2015 | Horaguchi ........... | B65H 23/185 |
| | | | | 226/1 |

* cited by examiner (b)

(c)

(d)

(e)

(a)

(b)

(a)

(b)

ROTATION DETECTING UNIT, SHEET FEEDING DEVICE AND IMAGE FORMING APPARATUS

FIELD OF THE INVENTION AND RELATED ART

The present invention relates to a rotation detecting unit for detecting rotation or non-rotation of a rotatable member and relates to a sheet feeding device including the rotation detecting unit and an image forming apparatus including the rotation detecting unit.

Conventionally, an encoder has been used for measuring a position and a physical amount such as a speed of a movable member. A rotary encoder detects the position and a rotational speed by forming a plurality of slits in a rotatable plate having a disk shape and by using a slit detecting device including a light-emitting portion and a light-receiving portion.

Further, also in the case where rotation detection of the rotatable member is made, the rotary encoder is used in some instances. In such a case, the rotatable plate is provided with a plurality of slits along a circumferential direction, and a single slit detecting device is used. The rotation detection is made by discriminating that the rotatable plate is in a rotation state in the case where signals during light-blocking and light transmission are repetitively outputted continuously from the slit detecting device and that the rotatable plate is in a non-rotation state in the case where the signal during the light-blocking or during the light transmission is outputted continuously as it is for a certain time or more.

In the case where the rotary encoder as described above is used as the rotation detecting unit, an output waveform varies depending on generation of noise thereon, so that even in a rest state, the rotatable plate is erroneously detected as being rotating in some cases.

SUMMARY OF THE INVENTION

A principal object of the present invention is to provide a rotation detecting unit capable of reducing a degree of erroneous detection with a simple constitution even in the case where a rotary encoder is used and is provided at a position where the rotary encoder is susceptible to vibration.

Another object of the present invention is to provide a sheet feeding device and an image forming apparatus which includes the rotation detecting unit.

According to an aspect of the present invention, there is provided a rotation detecting unit comprising: a light-emitting device for emitting light; a light-receiving device for receiving the light; an output device for outputting an output waveform changing depending on a received light quantity of the light-receiving device; a rotatable plate, rotatably supported by a shaft, for being irradiated with the light emitted from the light-emitting device and entering the light-receiving device; and a discriminating device for discriminating a state of the rotatable plate on the basis of the output waveform of the output device, wherein the rotatable plate includes a first portion and a second portion which are alternately provided along a circumferential direction, a third portion provided between the first portion and the second portion with respect to the circumferential direction, and a fourth portion provided between the second portion and the first portion with respect to the circumferential direction, wherein when a region of the first portion is irradiated with the light emitted from the light-emitting device and received by the light-receiving device, the received light quantity of the light-receiving device is a maximum, when a region of the second portion is irradiated with the light emitted from the light-emitting device and received by the light-receiving device, the received light quantity of the light-receiving device is a minimum, and wherein when the third portion or the fourth portion is irradiated with the light emitted from the light-emitting device and received by the light-receiving device, the received light quantity of the light-receiving device is larger than the minimum and is smaller than the maximum.

Further features of the present invention will become apparent from the following description of exemplary embodiments with reference to the attached drawings.

DESCRIPTION OF EMBODIMENTS

In the following, with reference to the drawings, embodiments in the case where a rotation detecting unit according to the present invention is applied to an electrophotographic printer as an example of an image forming apparatus will be specifically described. However, as regards dimensions, materials, shapes and relative arrangement of constituent elements described in the following embodiments, the scope of the present invention is not intended to be limited to those in the following embodiments unless otherwise specified.

Embodiment 1

Figure 2:
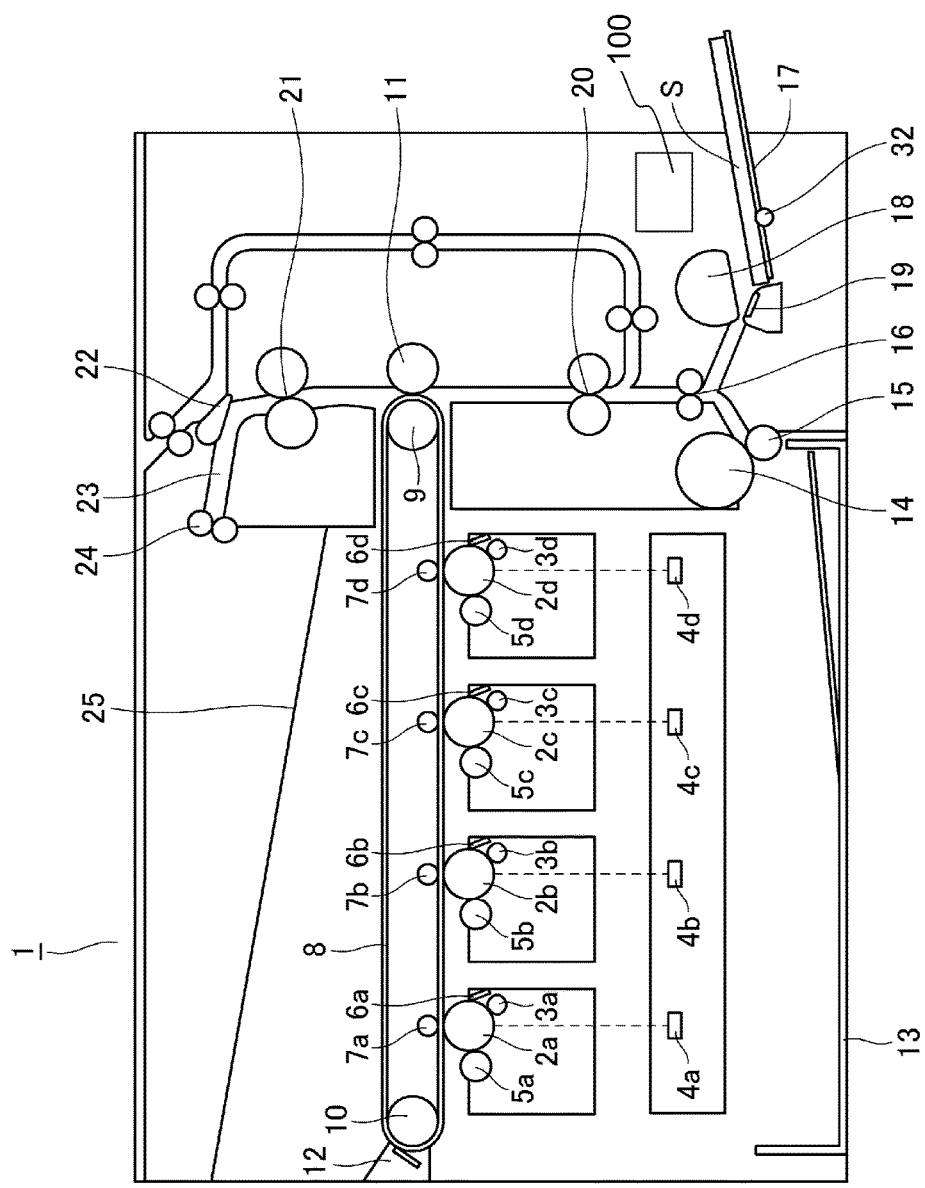
FIG. 2 is a sectional view showing a general structure of an electrophotographic printer in Embodiment 1.

An embodiment for carrying out the present invention will be described in detail with reference to the drawings. FIG. 2 is a sectional view showing a structure of a color electrophotographic image forming apparatus as an example of a sheet feeding means using a rotation detecting unit in this embodiment.

The image forming apparatus includes an image forming apparatus main assembly 1 in which 4 down-shaped image bearing members, i.e., photosensitive drums 2 (2a, 2b, 2c, 2d), which are juxtaposed as image bearing members in a substantially horizontal direction. The photosensitive drums 2 are rotationally driven in the clockwise direction in FIG. 2 by unshown driving means. Further, charging devices 3 (3a, 3b, 3c, 3d) for electrically charging surfaces of the photosensitive drums 2 uniformly and scanner units 4 (4a, 4b, 4c, 4d) for forming electrostatic latent images on the photosensitive drums 2 by irradiating the surfaces of the photosensitive drums 2 with laser beams on the basis of image information are provided. Further, developing devices 5 (5a, 5b, 5c, 5d) for developing the electrostatic latent images into toner images by depositing toners including developing materials on the electrostatic latent images and cleaning devices 6 (6a, 6b, 6c, 6d) for removing transfer residual remaining on the surfaces of the photosensitive drums 2 after transfer are provided.

In the image forming apparatus (image forming apparatus assembly 1), the photosensitive drums 2, the charging devices 3, the developing devices 5 and the cleaning devices 6 are integrally constituted as cartridge units and form images of different colors (yellow, magenta, cyan, black). Primary transfer rollers 7 (7a, 7b, 7c, 7d) contact an intermediary transfer belt 8 toward the photosensitive drums 2, and the toner images are transferred from the photosensitive drums 2 onto the intermediary transfer belt 8. The intermediary transfer belt 8 is stretched between a driving roller 9 and a tension roller 10, and is rotated in the counterclockwise direction by drive of the driving roller 9. A secondary transfer roller 11 provided at a position opposing the driving roller 9 through the intermediary transfer belt 8 transfers the toner images from the intermediary transfer belt 8 onto a sheet (paper) S. Further, at a position opposing the tension roller 10 through the intermediary transfer belt 8, an intermediary transfer belt cleaning device 12 is provided, and removes and collects a transfer residual toner remaining on the surface of the intermediary transfer belt 8. In this embodiment, an image forming means is constituted by the photosensitive drums 2, the charging devices 3, the developing devices 5, the cleaning devices 6, the primary transfer rollers 7 and the intermediary transfer belt 8.

As a feeding and conveying means for the sheet S, a sheet (paper) feeding cassette 13 provided at a lowermost portion of the image forming apparatus, a multi-sheet (paper) feeding portion 17 provided at a lower-right portion of the image forming apparatus, and a registration roller pair 20 for correcting oblique movement of the sheet S are provided. Further, a fixing means for fixing the toner images formed on the sheet S by the image forming portions for the respective colors through the intermediary transfer belt 8, a feeding path switching means 22 which is flapper, for double-sided printing, for guiding the sheet S to a discharging feeding path 23 during one-sided printing are provided. A sheet discharging roller pair 24 for discharging the sheet S onto a discharge tray 25 as a sheet stacking means is provided.

Next, an operation of the image forming apparatus will be described. A predetermined number of sheets S stacked on the multi-sheet feeding portion 17 are separated one by one by a feeding roller 18 and a separation pad 19, and the separated sheet S is fed to a fed sheet drawing roller pair 16. Similarly, a predetermined number of sheets S stacked on the feeding cassette 13 are separated one by one by a feeding roller 14 and a separation roller 15, and the separated sheet S is fed to the fed sheet drawing roller pair 16. The sheet S fed by the fed sheet drawing roller pair 16 is fed to the registration roller pair 20, and then is fed to a contact portion between the intermediary transfer belt 8 and the secondary transfer roller 11. The toner images transferred from the respective color image forming portions onto the intermediary transfer belt 8 are transferred from the intermediary transfer belt 8 into the sheet S at the contact portion between the intermediary transfer belt 8 and the secondary transfer roller 11, so that a color image is formed on the sheet S and then the sheet S is fed to the fixing means 21.

In the fixing means 21, heat and pressure are applied to the toner images transferred on the sheet S. As a result, the sheet S on which the plurality of color toner images are fixed is guided by the flapper 22 for the double-sided printing toward the discharging feeding path 23 side, and passes through the discharging roller pair 24, so that the sheet S is discharged onto the discharge tray 25.

Figure 1:
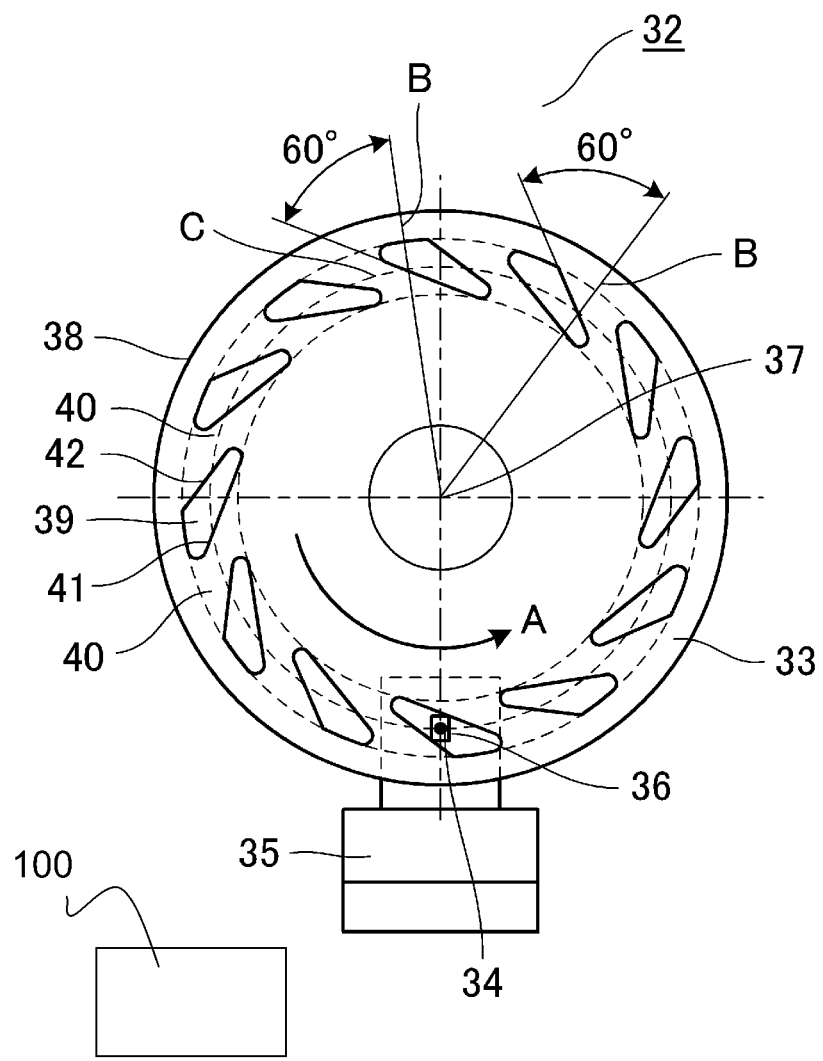
FIG. 1 is an illustration of a rotatable plate of a rotary encoder in Embodiment 1 of the present invention.
Figure 3:
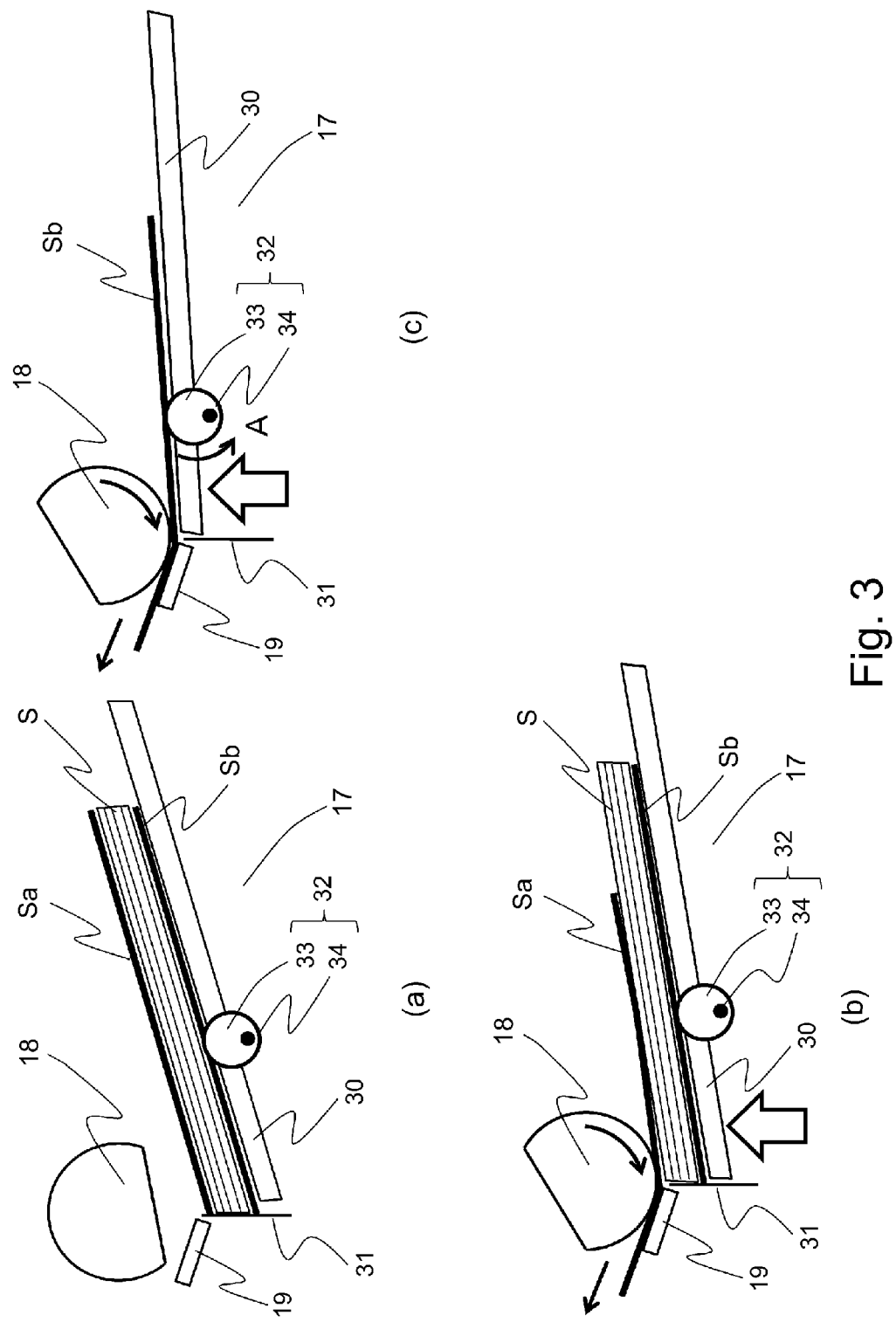
In FIG. 3, (a) to (c) are schematic views for illustrating a structure and an operation of a multi-sheet (paper) feeding portion in Embodiment 1.

Next, a structure of the multi-sheet feeding portion 17 in the image forming apparatus in this embodiment will be described with reference to FIGS. 3 and 1. In FIG. 3, (a) to (c) are schematic views for illustrating details of the structure and an operation of the multi-sheet feeding portion 17. FIG. 1 is an illustration showing details of a final sheet (paper) detecting mechanism using a rotary encoder which is a rotation detecting unit in the multi-sheet feeding portion 17 which is a sheet feeding device. In FIG. 3, (a) shows the multi-sheet feeding portion 17 during sheet feeding standby, (b) shows the multi-sheet feeding portion 17 during feeding of a sheet (paper) other than lowermost paper, and (c) shows the multi-sheet feeding portion 17 during feeding of the lowermost paper. Incidentally, by detecting the final paper (lowermost paper) of the multi-sheet feeding portion 17 from during feeding of the final paper by the feeding roller, it becomes possible to transmit a signal for stopping image formation on subsequent paper to the image forming portions when the final paper is fed. Therefore, the image forming portions do not consume an excessive toner.

In FIG. 3, the multi-sheet feeding portion 17, the feeding roller 18 as a semi-circular sheet feeding means, and the separation pad 19 for separating the stacked sheets S one by one are disposed. The sheet feeding intermediary plate 30 as a sheet stacking portion not only stacks the sheets S but also performs a raising and lowering operation for urging the sheets S against the feeding roller 18 at sheet feeding timing and for spacing the sheets S from the feeding roller 18 at timing other than the sheet feeding timing. The sheets S stacked on the sheet feeding intermediary plate 30 are fed into the apparatus main assembly in the order from uppermost paper (uppermost sheet) Sa toward the lowermost paper (lowermost sheet) Sb. A stacking wall 31 is a wall against which free ends of the sheets S stacked on the sheet feeding intermediary plate 30 abut. A rotary encoder 32 includes a rotatable plate 33 and an optical axis 34 (described specifically later) and sends a light-receiving signal, depending on a received light quantity of a light-receiving portion 36 in accordance with a positional relationship of the rotatable plate 33 relative to the optical axis 34 and the light-receiving portion 36, to a controller 100 as a discriminating device shown in FIGS. 1 and 2. The controller 100 includes a CPU and is capable of executing various control operations relating to the image formation.

Figure 4:
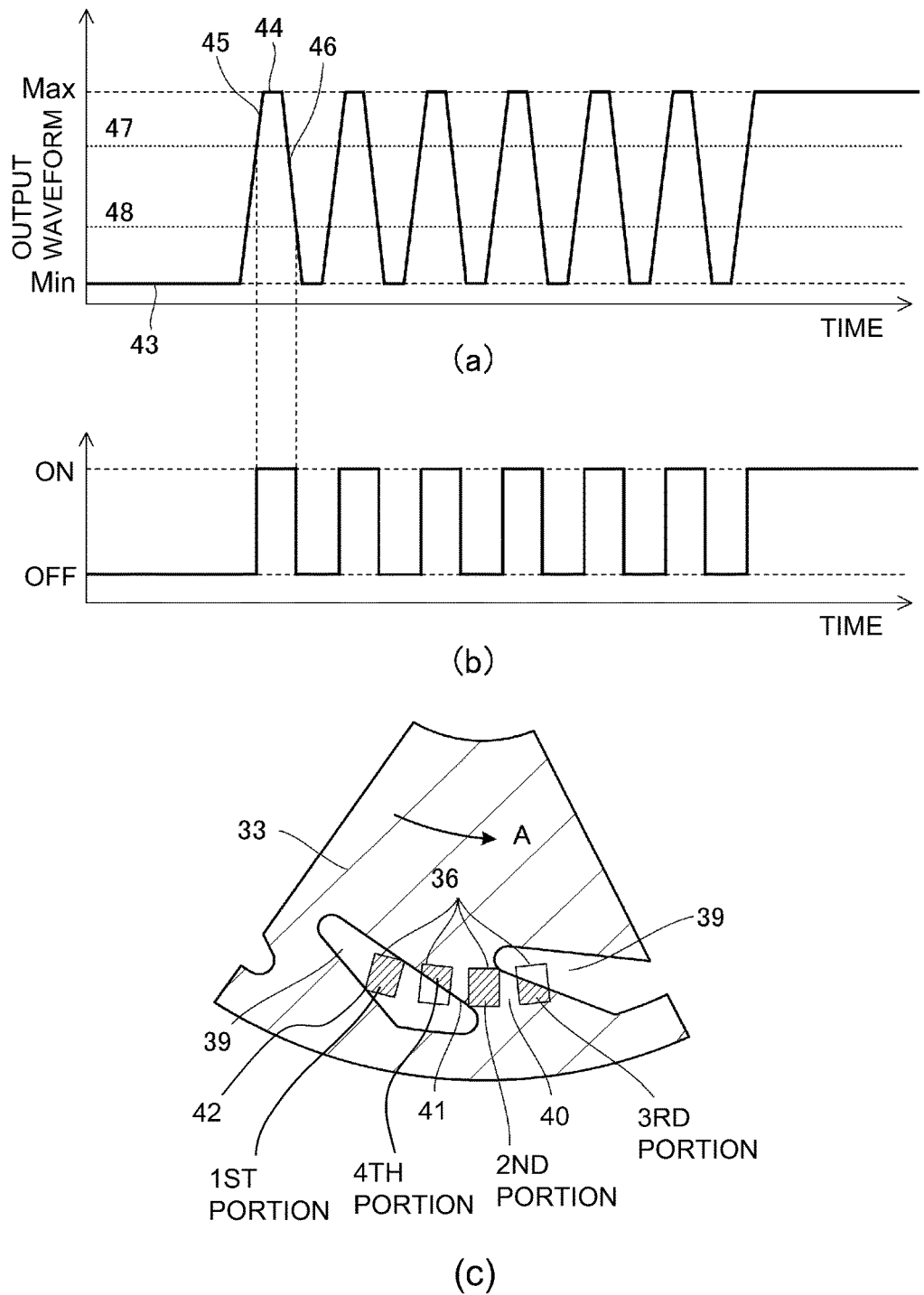
In FIG. 4, (a) to (c) are schematic views for illustrating an output waveform of a rotary encoder, ON-OFF discrimination by a controller, and a positional relationship among a light-receiving portion and an optical axis blocking portion and an optical axis transmitting portion of a rotatable plate, respectively.

In FIG. 1, a photo-interruptor 35 which is an output device for outputting a waveform varying in shape depending on the received light quantity of a light-receiving device is provided. Further, an unshown light-emitting element as a light-emitting device and the light-receiving portion 36 as the light-receiving device are disposed opposed to each other through the rotatable plate 33. The light-receiving portion 36 is constituted by a light-receiving element and a slit 36a which has a rectangular opening surrounding the light-receiving element and which functions as a light-receiving region limiting means (means for limiting the received light to light with which a region in the opening is irradiated. The slit 36a will be described later with reference to FIG. 5. The rectangular slit 36a has a long edge extending along a substantially radial direction. Hereinafter, the rectangular slit 36a is defined as a light receivable range in which the light from the light-emitting element is receivable by the light-receiving element. The photo-interruptor 35 receives infrared rays emitted from an unshown light-emitting element and outputs a signal to an unshown controller depending on the received light quantity of the light-receiving portion 36. The optical axis 34 connects an unshown light-emitting element and the light-receiving portion 36 by a rectilinear line. The rotatable plate 33 is rotatably supported by a shaft (not shown) and rotates about a rotatable plate center 37. Further, a circumferential portion 38 of the rotatable plate 33 contacts the lowermost paper Sb (FIG. 3). A hole-shaped optical axis (light-)transmitting portion 39 functions as an opening through which the light from the unshown light-emitting element passes and which penetrates in an axial direction. An optical axis (light-)blocking portion 40 functions as a light-blocking portion for blocking the light from the unshown light-emitting element. Here, a circle C has the rotatable plate center 37 as a rotation center and has a radius distance which is a line connecting the rotatable plate center 37 and a center of the optical axis 34. A plurality of optical axis transmitting portions 39 and a plurality of optical axis blocking portions 40 are alternately disposed at regular intervals along a circumferential direction on the circle C. When the rotatable plate 33 rotates in a rotational direction A, a first boundary portion 41 switches from the optical axis blocking portion 40 to the optical axis transmitting portion 39, and a second boundary portion 40 switches from the optical axis transmitting portion 39 to the optical axis blocking portion 40. Here, a rectilinear line B connects the rotatable plate center 37 and an arbitrary point of the circumferential portion 38 in a radial direction. In this embodiment, each of the first boundary portion 41 and the second boundary portion 42 was set to have an inclination angle of 60° relative to the rectilinear line B with respect to the counterclockwise direction at a point of intersection of the circle C and the rectilinear line B. In FIG. 4, (a) shows an output waveform outputted from the photo-interruptor 5, and (b) shows ON-OFF discrimination at an unshown controller. A minimum received light output 43 is an output when the optical axis blocking portion 40 light-blocks the optical axis 34 and the light-receiving portion 36 and the received light quantity of the light-receiving portion 36 is a minimum. A maximum received light output 44 is an output when the optical axis transmitting portion 39 transmits the optical axis 34 and the received light quantity of the light-receiving portion 36 is a maximum. When the rotatable plate 33 rotates in a rotational direction A shown in FIG. 1, a first boundary output 45 and a second boundary output 46 are outputted during passing of the first boundary portion 41 and the second boundary portion 42, respectively, through the optical axis 34 and the light-receiving portion 36. A first threshold 47 and a second threshold 48 are the following values. During the first boundary output 45 in which the output waveform from the photo-interruptor 35 increases, the first threshold 47 is the value for which the unshown controller makes discrimination of ON (state) in the case where the output exceeds the first threshold 47 and makes discrimination of OFF (state) in the case where the output does not exceed the first threshold 47. During the second boundary output 46 in which the output waveform of the photo-interruptor 35 decreases, the second threshold is the value for which the unshown controller makes discrimination of OFF in the case where the output is less than the second threshold 48 and makes discrimination of ON in the case where the output is not less than the second threshold 48. The first threshold 47 is made larger than the second threshold 48.

In FIG. 4, (c) shows a positional relationship among the light-receiving portion 36 and the optical axis blocking portion 40 and the optical axis transmitting portion 39 of the rotatable plate 33. In (c) of FIG. 4, a region (first portion-to-be-detected)(first portion) included in the optical axis transmitting portion 39 of the rotatable plate 33 is irradiated with the light to be received by the light-receiving portion 36. At this time, the light to be received by the light-receiving portion 36 passes through the optical axis transmitting portion 39. Accordingly, the light entering the light-receiving portion 36 is not blocked by the rotatable plate 33, so that the received light quantity at the light-receiving portion 36 is a maximum. In (c) of FIG. 4, a region (second portion-to-be-detected)(second portion) covered with the optical axis blocking portion 40 of the rotatable plate 33 is irradiated with the light to be received by the light-receiving portion 36. At this time, the light to be received by the light-receiving portion 36 is blocked by the optical axis blocking portion 40. Accordingly, the received light quantity at the light-receiving portion 36 is a minimum. As shown in (c) of FIG. 4, when the rotatable plate 33 rotates, a region (third portion-to-be-detected)(third portion) between the region included in the optical axis transmitting portion 39 and the region covered with the optical axis blocking portion 40 is irradiated along a circumferential direction of the rotatable plate 33 with the light to be received. With the rotation of the rotatable plate 33 in an arrow direction, the second boundary portion 42 crosses an optical path of the light to be received by the light-receiving portion 36 so as to obliquely cross an edge portion of the rectangular slit 36a. At this time, at the opening of the slit 36a of the light-receiving portion 36, a proportion of an area occupied by the optical axis blocking portion 40 to an area occupied by the optical axis transmitting portion 39 gradually increases at the opening of the slit 36a. Accordingly, with the rotation of the rotatable plate 33 in the arrow direction, the received light quantity at the light-receiving portion 36 gradually decreases. Here, at the opening of the slit 36a of the light-receiving portion 36, a manner of changes of the proportion of the area occupied by the optical axis blocking portion 40 to the area occupied by the optical axis transmitting portion 39 and the received light quantity at the light-receiving portion 36 is different depending on a manner of rotation of the rotatable plate 33. As shown in (c) of FIG. 4, when the rotatable plate 33 rotates, a region (fourth portion-to-be-detected)(fourth portion) between the region covered with the optical axis blocking portion 40 and the region included in the optical axis transmitting portion 39 is irradiated along the circumferential direction of the rotatable plate 33 with the light to be received by the light-receiving portion 36. With the rotation of the rotatable plate 33 in the arrow direction, the first boundary portion 41 crosses the optical path of the light to be received by the light-receiving portion 36 so as to obliquely cross an edge of the rectangular slit 36a. At this time, at the opening of the slit 36a of the light-receiving portion 36, the proportion of the area occupied by the optical axis blocking portion 40 to the area occupied by the optical axis transmitting portion 39 gradually decreases. Accordingly, with the rotation of the rotatable plate 33 in the arrow direction, the received light quantity at the light-receiving portion 36 gradually increases. Also in this case, at the opening of the slit 36a of the light-receiving portion 36, the manner of changes of the proportion of the area occupied by the optical axis blocking portion 40 to the area occupied by the optical axis transmitting portion 39 and the received light quantity at the light-receiving portion 36 is different depending on the manner of the rotation of the rotatable plate 33.

An unshown light-emitting portion (light-emitting element) emits, toward the light-receiving portion 36, light having a predetermined range, as an irradiation range, including the optical axis 34, as a center, including the light-receiving portion 36. A light-receivable range in which the light-receiving portion 36 rotates the light from the light-emitting portion is defined by the slit 36a (light-receivable region). The rotatable plate 33 is provided rotatably between the light-emitting portion and the light-receiving portion 36. The rotatable plate 33 includes the optical axis blocking portion 40 for blocking the light emitted from the light-emitting portion toward the light-receiving portion 36 and the optical axis transmitting portion 39 (hole shape in this embodiment) for permitting light transmission of the light emitted from the light-emitting portion toward the light-receiving portion 36 and for causing the light-receiving portion 36 to receive the light. The rotatable plate 33 is capable of changing a quantity of the light received by the light-receiving portion 36 by a change in light-blocking range of the optical axis blocking portion 40 by the rotation thereof.

Here, the light-blocking range by the optical axis blocking portion 40 is an overlapping region between the slit 36a and a region of the rotatable plate 33 other than the optical axis transmitting portion 39 when the rotatable plate 33 is seen (projected) in a direction of the optical axis 34 (i.e., a direction perpendicular to the drawing sheet) in (c) of FIG. 3. A feature of this embodiment is a manner of spread of the optical axis blocking portion 40 by the rotation of the rotatable plate 33.

Specifically, a boundary line between the optical axis blocking portion 40 and the optical axis transmitting portion 39 (i.e., an edge of the hole) is formed so as to have an angle relative to a direction (radial direction of the rotatable plate 33) perpendicular to the rotational direction of the rotatable plate 33 (or so as to include a region having the region). As a result, the light-blocking range is constituted so as to extends in an oblique direction relative to the slit 36a with respect to the rotational direction of the rotatable plate 33 (i.e., a boundary line between the light-blocking range and a non-light-blocking range obliquely moves in the rotational direction 9.

On the other hand, in a comparison example, a boundary line is constituted in a shape perpendicular to a rotational direction of a rotatable plate (i.e., a shape along a light-blocking portion), so that a light-blocking range extends in the same direction as the rotational direction of the rotatable plate (i.e., a boundary between the light-blocking range and a non-light-blocking range moves in the same direction as the rotational direction). Accordingly, in the case where the rotatable plate rotates at the same speed, a time required to change a light-blocking state by the rotatable plate from a state in which the light-blocking range is not formed to a state in which the light-blocking range extends over an entirety of a light receivable region of the light-receiving portion is longer in this embodiment than in the comparison example. This is true for a time required for a reverse change. As a result, it is possible to increase a margin for avoiding erroneous detection of the output due to vibration or the like of the rotatable plate.

In this embodiment, when the rotatable plate 33 is positioned at such a rotational phase that the light-blocking range extends over an entire region of the slit 36a (light receivable range by the light-receiving portion), a region portion where the rotatable plate 33 is irradiated with the light from the light-emitting portion corresponds to the "second portion-to-be-detected" in the present invention. Further, in this embodiment, when the rotatable plate 33 is positioned at such a rotational phase that the entire region of the slit 36a is included the optical axis transmitting portion 39, an overlapping region portion between the optical axis transmitting portion 39 and the slit 36a corresponds to the "first portion-to-be-detected" in the present invention. The first portion-to-be-detected and a second portion-to-be-detected are alternately disposed along the circumferential direction. Further, in this embodiment, when the rotatable plate 33 is positioned at a rotational phase in a process in which the light-blocking range gradually extends, a region portion irradiated with the light from the light-emitting portion corresponds to the "third portion-to-be-detected" in the present invention. Further, in this embodiment, when the rotatable plate 33 is positioned at a rotational phase in a process in which the light-blocking range gradually narrows, a region portion irradiated with the light from the light-emitting portion corresponds to the "fourth portion-to-be-detected".

Figure 13:
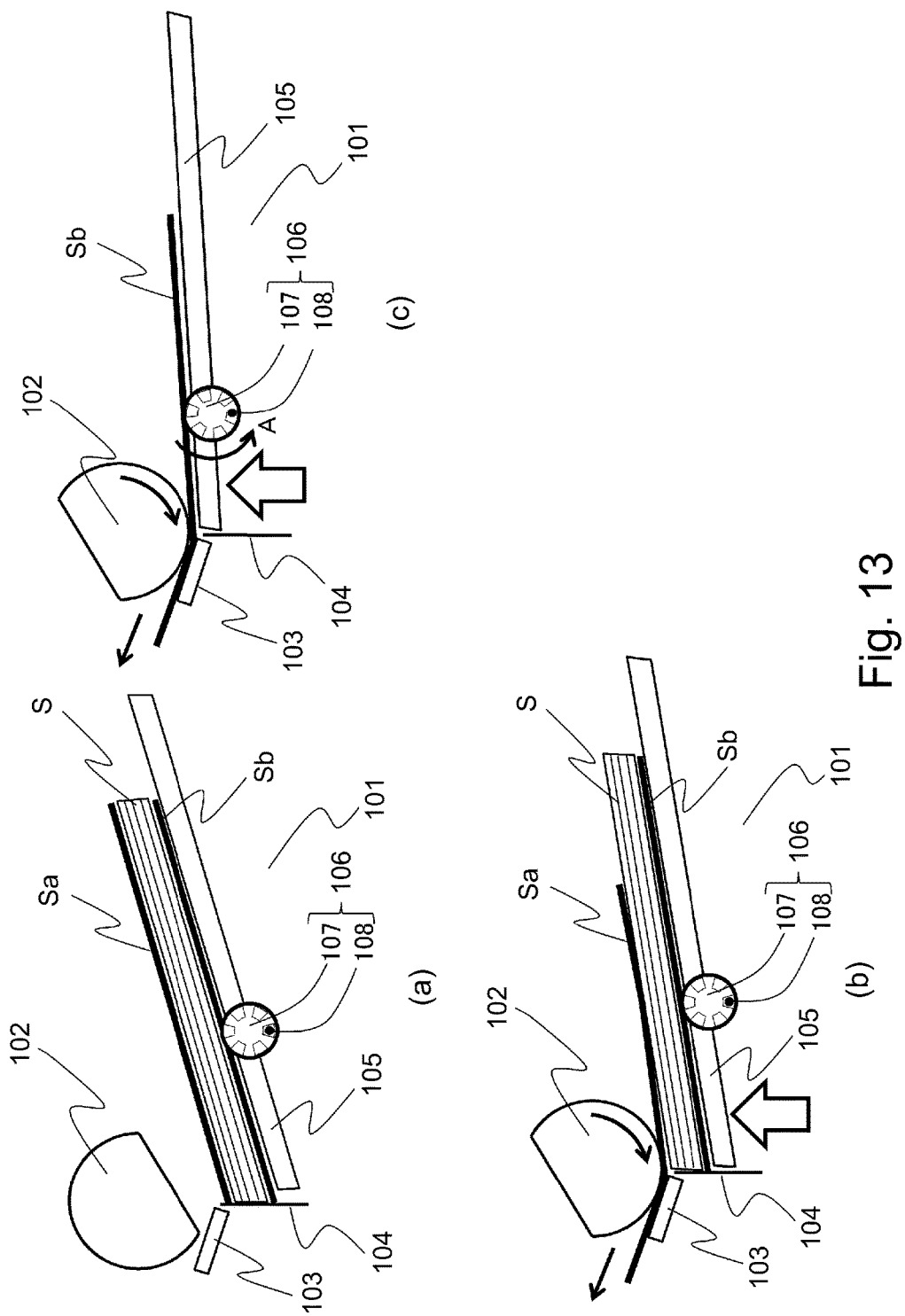
In FIG. 13, (a) to (c) are illustrations showing a final sheet (paper) detecting constitution using a rotary encoder in the comparison example.
Figure 14:
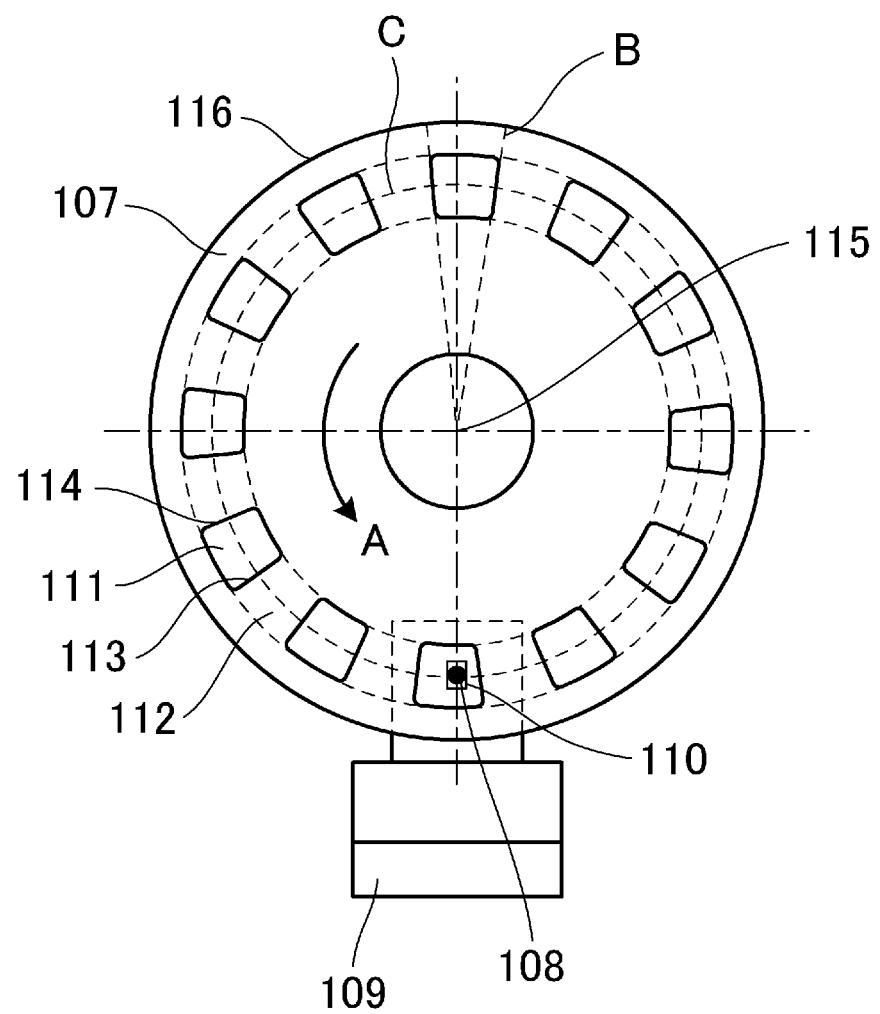
FIG. 14 is an illustration showing details of the rotary encoder in the comparison example.
Figure 15:
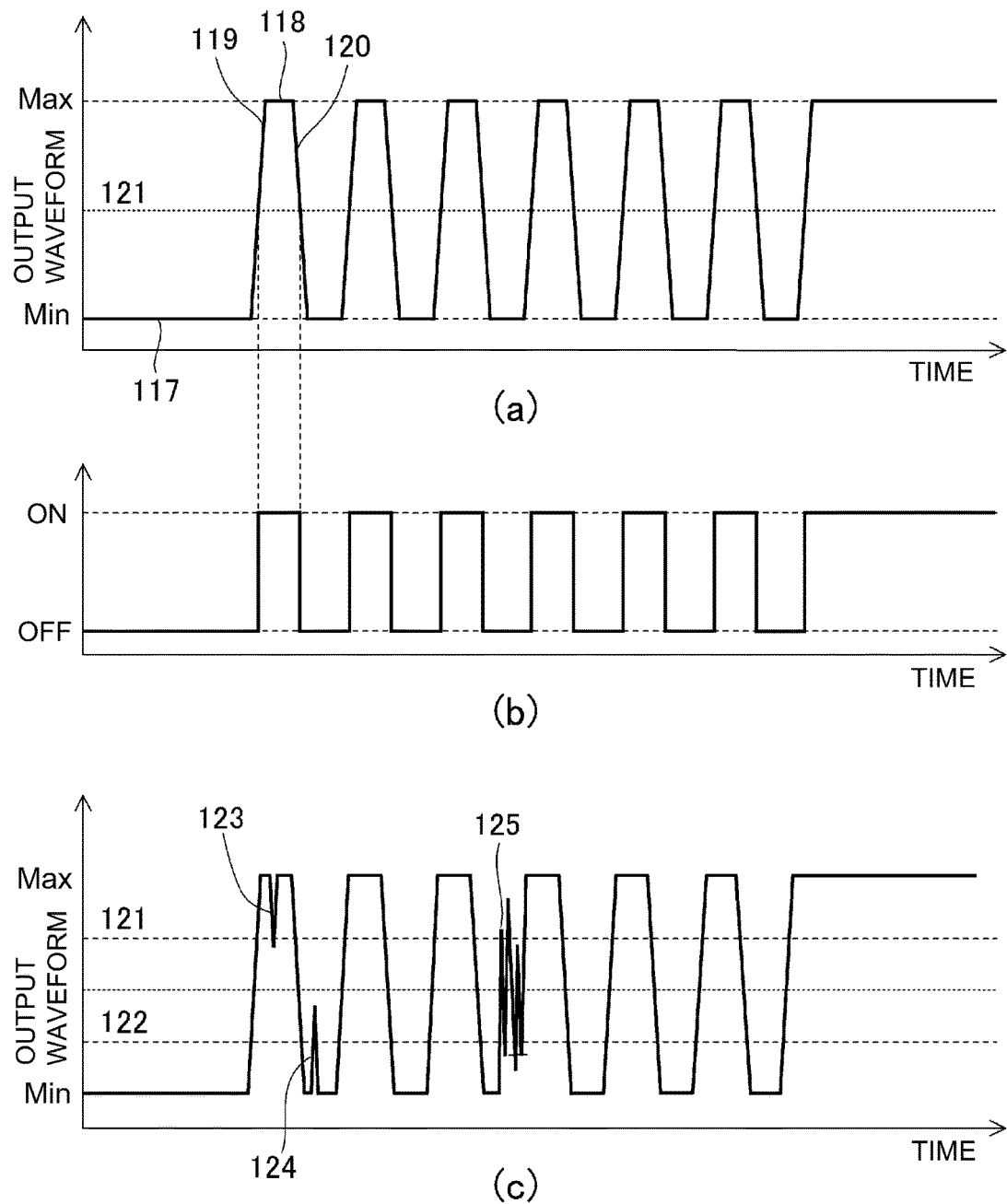
In FIG. 15, (a) and (c) are schematic views each showing an output waveform of the rotary encoder in the comparison example, and (b) is a schematic view showing ON-OFF discrimination by the controller in the comparison example.

In the following, with reference to FIGS. 13, 14 and 15, in a rotary encoder constitution in the comparison example, a constitution of final paper (sheet) detection of a sheet feeding device will be described. In FIG. 13, (a) to (c) are schematic views showing the case where the rotary encoder constitution in the comparison example is used for the sheet feeding device, in which (a) shows a state during stand-by of sheet feeding, (b) shows a state during feeding of sheets other than the lowermost paper (sheet), and (c) shows a state during feeding of the lowermost paper. FIG. 14 is an illustration showing details of the rotary encoder in the comparison example. In FIG. 15, (a) to (c) are schematic views each showing a signal outputted from the rotary encoder in the comparison example.

In FIG. 13, a sheet feeding device 101 includes a feeding roller 102, a separation pad 103, a stacking wall 104 and a sheet feeding intermediary plate 105. Sheets S are stacked on the sheet feeding intermediary plate 105, of which uppermost paper (sheet) Sa is fed by the feeding roller 102 and lowermost paper (sheet) Sb contacts the sheet feeding intermediary plate 105. The sheet feeding device 101 further includes a rotary encoder 106 and a rotatable plate 107. In FIG. 13, an optical axis 108 of a photo-interruptor 109 described below with reference to FIG. 14 is shown.

In FIG. 14, the photo-interruptor 109 includes an unshown light-emitting element and a light-receiving portion 110 which oppose each other through the rotatable plate 107. The photo-interruptor 109 receives infrared rays (light), emitted from the unshown light-emitting element, by the light-receiving portion 110 are outputs a signal to an unshown controller depending on a quantity of the light received by the light-receiving portion 110. The optical axis 108 connects the light-emitting element and the light-receiving portion 110 by a rectilinear line. The rotatable plate 107 is a plurality of optical axis transmitting portions 111 and a plurality of optical axis blocking portions 112 at regular intervals along a circumferential direction. Each optical axis transmitting portion 111 has, when the rotatable plate 107 rotates in a rotational direction A, a first boundary portion 113 of movement from the optical axis blocking portion 112 to the optical axis transmitting portion 111 and a second boundary portion 114 of movement from the optical axis transmitting portion 111 to the optical axis blocking portion 112. Each of the first boundary portion 113 and the second boundary portion 114 is formed in a shape of a rectilinear line which connects a rotatable plate center 115 and an associated one point of a circumferential portion 116 along a radial direction. The circumferential portion 116 of the rotatable plate 107 contacts the lowermost paper Sb of the sheets stacked on the sheet feeding intermediary plate 105.

FIG. 15 shows a signal waveform outputted from the photo-interruptor 109. A minimum received light output 117 is signal when the optical axis blocking portion 112 light-blocks the optical axis 108 and thus a received light quantity of the light-receiving portion 110 is minimum, and a maximum received light output 118 is a signal when the optical axis transmitting portion 111 permits light transmission of the optical axis 108 and thus the received light quantity of the light-receiving portion 110 is maximum. A first boundary output 119 and a second boundary output 120 are outputted when the light passes through the first boundary portion 113 and the second boundary portion 114, respectively. A threshold 121 is used for making ON-OFF discrimination from a value of an output waveform by an unshown controller.

In the state of (a) of FIG. 13, the sheet feeding intermediary plate 105 stacks the sheets and is on stand-by. At sheet feeding timing, in accordance with a signal from the unshown controller, the sheet receiving intermediary plate 105 is raised by an unshown spring so that the uppermost paper Sa press-contacts the feeding roller 102 ((b) of FIG. 13). When the feeding roller 102 rotates and the uppermost paper Sa is fed toward the separation pad 103 side, the sheet feeding intermediary plate 105 is pressed downward by an unshown cam, so that the sheet feeding intermediary plate 105 returns to the state of (a) of FIG. 13. During a series of these operations, the rotatable plate 107 does not rotate. For this reason, the output waveform continuously outputs the minimum received light output 117 when the optical axis blocking portion 112 light-blocks the optical axis 108 and the light-receiving portion 110, and continuously outputs the maximum received light output 118 when the optical axis transmitting portion 111 continuously permits light-transmission of the optical axis 108 and the light-receiving portion 110.

Therefore, the output waveform does not exceed the threshold 121 or is not less than the threshold 121. The unshown controller discriminates that the sheets S are stacked since ON (state) or OFF (state) is not switched, and thus continues a sheet feeding operation for a subsequent sheet.

When the lowermost paper Sb is fed as shown in (c) of FIG. 13, the sheet feeding intermediary plate 105 is raised by the unshown spring so that the lowermost paper Sb press-contacts the feeding roller 102. When the feeding roller 102 rotates and the lowermost paper Sb is fed toward the separation pad 103 side, the circumferential portion 116 of the rotatable plate 107 contacts the lowermost paper Sb, and therefore the rotatable plate 107 starts rotation. At the time when the lowermost paper Sb is fed and does not contact the circumferential portion 116 of the rotatable plate 107, the rotation of the rotatable plate 107 stops. When the rotatable plate 107 rotates in the rotational direction A from a state in which the optical axis blocking portion 112 light-blocks the optical axis 108 and the light-receiving portion 110 and is at rest, relative to the optical axis 108 and the light-receiving portion 110, the rotatable plate 107 rotates in the order of the first boundary portion 113, the optical axis transmitting portion 111, the second boundary portion 114 and the optical axis blocking portion 112. The output waveform from the photo-interruptor 109 is outputted in the order of the minimum received light output 117, the first boundary output 119, the maximum received light output 118, the second boundary output 120, and the minimum received light output 117. The unshown controller discriminates that the state is switched from the OFF (state) to the ON (state) when the first boundary output 119 exceeds the threshold 121 which is an intermediary value between the minimum received light output 117 and the maximum received light output 118. Further, when the second boundary output 120 is less than the threshold 121, the unshown controller discriminates that the state is switched from the ON (state) to the OFF (state). In the case where repetition of the ON and the OFF is outputted to the unshown controller, the controller discriminates that the lowermost paper Sb is fed. Then, the controller discriminates that no sheet S exists on the sheet feeding intermediary plate 105 and stops the sheet feeding operation for paper (sheet) subsequent to the lowermost paper Sb.

Incidentally, in the rotary encoder in the comparison example shown in FIG. 14, the portions corresponding to the first portion-to-be-detected and the second portion-to-be-detected in the present invention are the optical axis transmitting portion 111 and the optical axis blocking portion 112, respectively. However, in the rotary encoder in the comparison example, the optical axis transmitting portion 111 and the optical axis blocking portion 112 are adjacent to each other, so that there is no portions corresponding to the third portion-to-be-detected and the fourth portion-to-be-detected in the present invention.

Next, an operation in final paper detection of the multi-sheet feeding portion will be described in detail with reference to FIGS. 3, 1 and 4. In a sheet feeding stand-by state of (a) of FIG. 3, the sheet feeding intermediary plate 30 stacks the sheets S and is on stand-by. In accordance with a signal from the unshown controller, at sheet feeding timing, the sheet feeding intermediary plate 30 is raised so that the uppermost paper Sa press-contacts the feeding roller 18 by an unshown spring as shown in (b) of FIG. 13. When the feeding roller 18 rotates and the uppermost paper Sa is fed toward the separation pad 19 side, the sheet feeding intermediary plate 30 is pressed downward by an unshown cam, so that the sheet feeding intermediary plate 105 returns to the state of (a) of FIG. 3. During a series of these operations, the lowermost paper Sb remains on the sheet feeding intermediary plate 30. The lowermost paper Sb and the circumferential portion 38 (FIG. 1) of the rotatable plate 33 are in a contact state, and therefore the rotatable plate 33 does not rotate. The output waveform of the photo-interruptor 35 at this time continuously outputs a minimum received light output 43 (FIG. 4) when the optical axis blocking portion 40 (FIG. 1) light-blocks the optical axis 34 and the light-receiving portion 36, and continuously outputs a maximum received light output 44 (FIG. 4) when the optical axis transmitting portion 39 (FIG. 1) is positioned on the optical axis 34 and the light-receiving portion 36. In this case, the output waveform does not change so as to exceed the first threshold 47 and be less than the second threshold 48, and therefore the unshown controller continuously sends an ON signal or an OFF signal. In this case, the controller discriminates that the sheets exist on the sheet feeding intermediary plate 30 and continues the sheet feeding operation.

When the lowermost paper Sb is fed as shown in (c) of FIG. 3, in accordance with the signal from the unshown controller, at sheet feeding timing, the sheet feeding intermediary plate 30 is raised by the unshown spring as shown in (c) of FIG. 3 so that the lowermost paper Sb press-contacts the feeding roller 18. When the feeding roller 18 rotates and the lowermost paper Sb is fed toward the separation pad 19 side, the rotatable plate 33 contacting the lowermost paper Sb starts rotation in the rotational direction A. Therefore, at the time when the lowermost paper Sb is fed and does not contact the circumferential portion 38 (FIG. 1) of the rotatable plate 33, the rotation of the rotatable plate 33 stops. For example, the rotatable plate 33 starts rotation in the rotational direction A by passing of the final paper Sa in a state in which the optical axis blocking portion 40 (FIG. 1) light-blocks the optical axis 34 and the light-receiving portion 36. Relative to the optical axis 34, the rotatable plate 33 rotates in the order of the optical axis blocking portion 40, the first boundary portion 41, the optical axis transmitting portion 39, the second boundary portion 42 and the optical axis blocking portion 40. The output waveform from the photo-interruptor 35 is outputted in the order of a minimum received light waveform 43, a first boundary waveform 41, a maximum received light waveform 44, a second boundary waveform 46 and the minimum received light waveform 43 in FIG. 4. The unshown controller which received this output waveform discriminates that the state is switched from the OFF (state) to the ON (state) when the first boundary output waveform 45 exceeds the first threshold 47. Further, when the second boundary waveform 46 is less than the second threshold 48, the unshown controller discriminates that the state is switched from the ON (state) to the OFF (state). In the case where repetition of the ON and the OFF generated, the unshown controller discriminates that the lowermost paper Sb (FIG. 3) is fed. Then, the controller discriminates that no sheet S exists on the sheet feeding intermediary plate 30 and stops the sheet feeding operation for paper (sheet) subsequent to the lowermost paper Sb.

Figure 5:
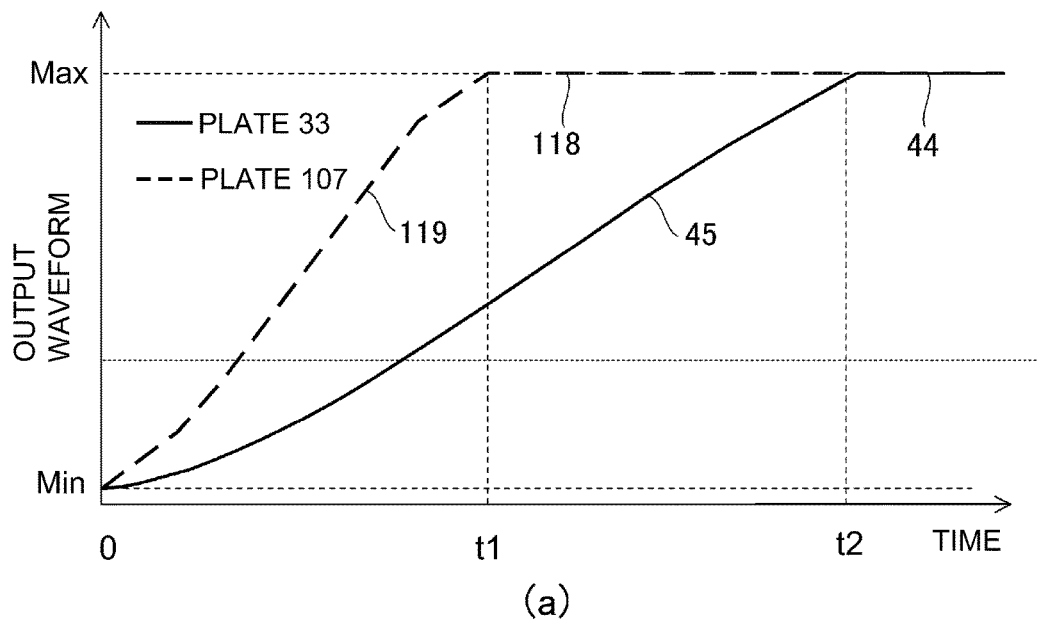
In FIG. 5, (a) is a graph showing an output waveform of a photo-interruptor, and (b) to (e) are schematic views each showing a light-blocking state.
Figure 5:
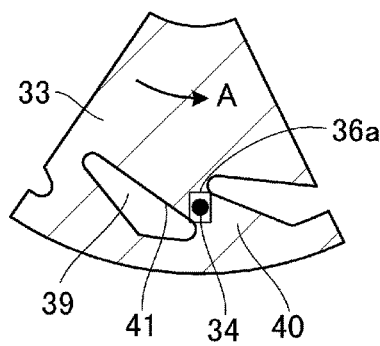
Figure 5:
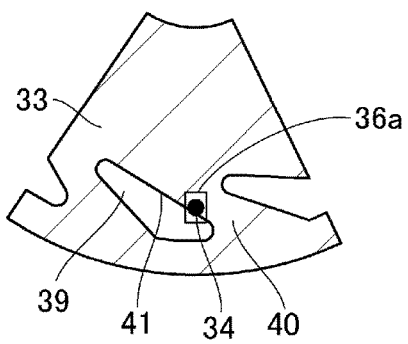
Figure 5:
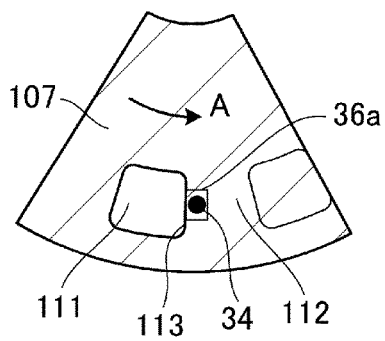
Figure 5:
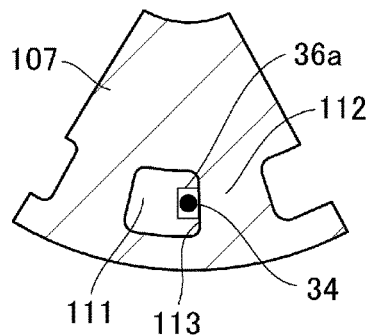

Next, with reference to FIG. 5, as a feature of the constitution in this embodiment, a relationship between a shape of the optical axis blocking portion 40 of the rotatable plate 33 and the output waveform will be described in comparison with the case where the rotatable plate 107 (FIG. 14) in the comparison example is used as the multi-sheet feeding portion 17. In FIG. 5, (a) is a graph showing the output waveform when the rotatable plate 33 in FIG. 1 rotates in the rotational direction A from the optical axis blocking portion 40 to the optical axis transmitting portion 39 through the first boundary portion 41 relative to the optical axis 34 and the light-receiving portion 36. Further, (a) of FIG. 5 is the graph also showing the output waveform in the case where the rotatable plate 107 in the comparison example rotates in the rotational direction A from the optical axis blocking portion 112 to the optical axis transmitting portion 111 through the first boundary portion 113 relative to the optical axis 34. At this time, the rotational speeds of the rotatable plate 33 and the rotatable plate 107 are the same. In the graph of (a) of FIG. 5, a solid line represents the output waveform when the rotatable plate 33 is used, and a broken line represents the output waveform when the rotatable plate 107 is used. The abscissa represents a time, and the ordinate represents the output waveform of the photo-interruptor 35. In (a) of FIG. 5, t1 is a time of rotation of the rotatable plate 107 from the optical axis blocking portion 112 to the optical axis transmitting portion 111 through the first boundary portion 113, and t2 is a time of rotation of the rotatable plate 33 from the optical axis blocking portion 40 to the optical axis transmitting portion 39 through the first boundary portion 41.

In FIG. 4, (b) is an illustration showing a state in which the optical axis blocking portion 40 of the rotatable plate 33 light-blocks the optical axis 34 and the light-receiving portion 36 when the time is 0, and (c) is an illustration showing a state in which the first boundary portion 41 of the rotatable plate 33 light-blocks the optical axis 34 and the light-receiving portion 36 when the time is t1. In FIG. 5, (d) is an illustration showing a state in which the optical axis blocking portion 112 of the rotatable plate 107 in the comparison example light-blocks the optical axis 34 and the light-receiving portion 36 when the time is 0, and (e) is an illustration showing a state in which the optical axis transmitting portion 111 permits complete light-transmission of the optical axis 34 and the light-receiving portion 36 when the time is t1.

In the case where the rotatable plate 33 and the rotatable plate 107 rotate in the rotational direction at the same speed, a time of rotation of the rotatable plate 107 from the optical axis blocking portion 112 shown in (d) of FIG. 5 to the optical axis transmitting portion 111 shown in (e) of FIG. 5 through the first boundary portion 113 is t1. On the other hand, after a lapse of t1 from the state of (b) of FIG. 5, the rotatable plate 33 is merely in a state in which the optical axis 34 and the light-receiving portion 36 are light-blocked at the first boundary portion 41 by half or less as shown in (c) of FIG. 5. In order to rotate the rotatable plate 33 to the optical axis transmitting portion 39, it takes a time of t2. This is because relative to the rectangular light-receiving portion 36, the first boundary portion 41 of the rotatable plate 107 in the comparison example passes along a short side of the rectangular slit 36a. On the other hand, the rotatable plate 33 in this embodiment includes the first boundary portion 41 having an inclination of 60° along the counterclockwise direction (FIG. 1). For this reason, the first boundary portion 41 passes on a substantially diagonal line of the rectangular slit 36a of the light-receiving portion 36. The diagonal line is longer than the short side, and therefore, when the first boundary 41 passes through the light-receiving portion 36 at the same speed, the rotatable plate 33 requires a larger time. A slope of the change, in received light quantity from the minimum to the maximum, of the first boundary output (waveform) 45 at the first boundary portion 41 is gentler than that of the first boundary output 119 at the first boundary portion 113 of the rotatable plate 107.

Figure 6:
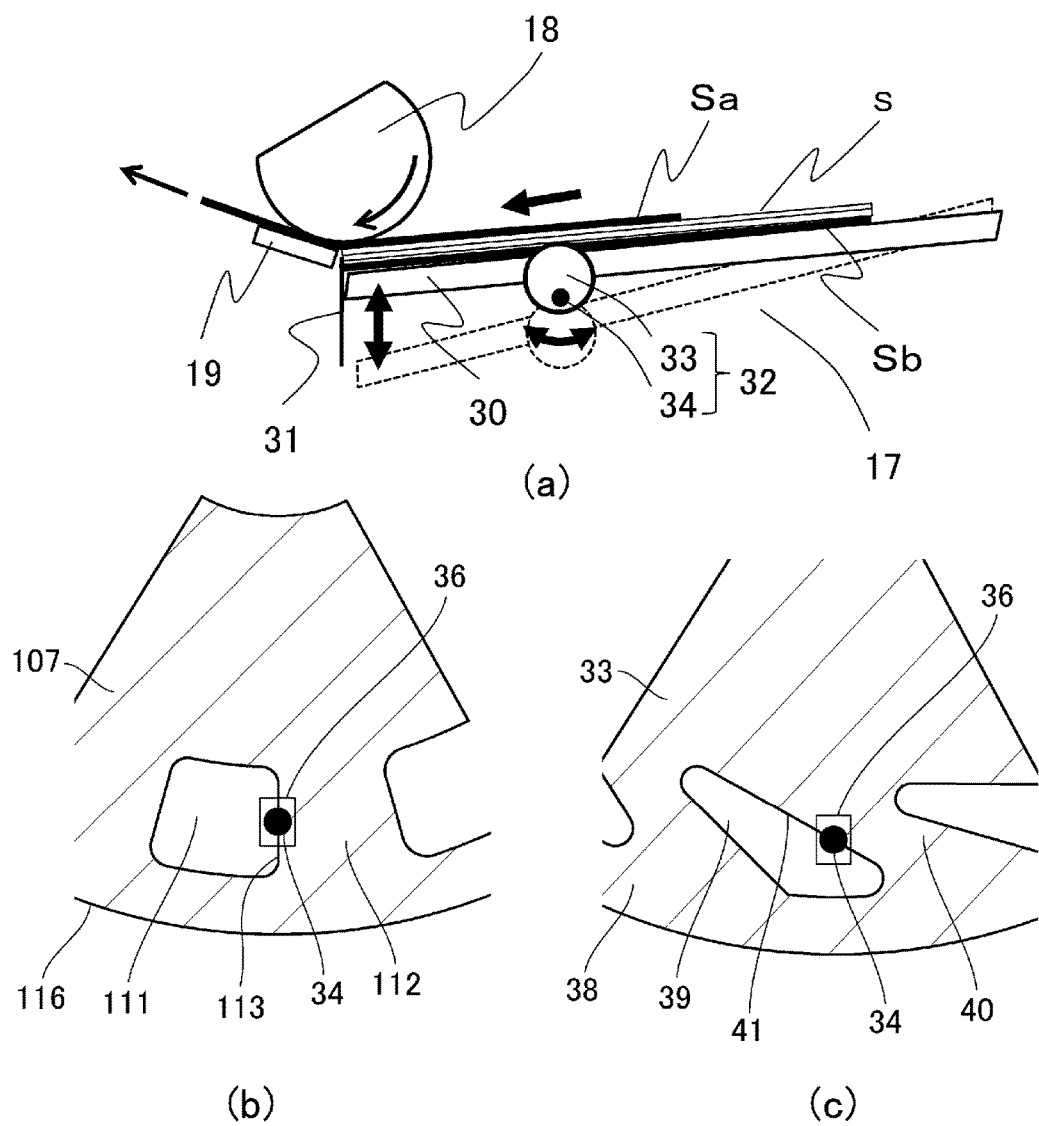
In FIG. 6, (a) is an illustration showing a state in which vibration is applied to a sheet feeding intermediary plate of the multi-sheet feeding portion in a sheet feeding operation, and FIGS. (b) and (c) are comparison example stops of the rotable plate.

Next, when reference to FIGS. 6, 7 and 8, the output waveform of the photo-interruptor 35 during generation of chattering due to vibration or the like in the case where the rotary encoder 32 in this embodiment is used for detecting the final paper at the multi-sheet feeding portion 17, and the ON-OFF discrimination by the unshown controller will be described. In FIG. 6, (a) is an illustration showing a sheet feeding state when a stacking amount of the sheets S at the multi-sheet feeding portion 17 is small, and (c) is an illustration showing a relationship among the optical axis 34, the light-receiving portion 36 and the first boundary portion 41 when the rotation of the rotatable plate 33 in this embodiment is stopped at the first boundary portion 41. In FIG. 6, (b) is an illustration showing a relationship among the optical axis 34, the light-receiving portion 36 and the first boundary portion 113 when the rotation of the rotatable plate 107 in the comparison example is stopped at the first boundary portion 113 in the case where the rotatable plate 107 is used as the rotary encoder 32 of the multi-sheet feeding portion 17 in this embodiment.

Figure 7:
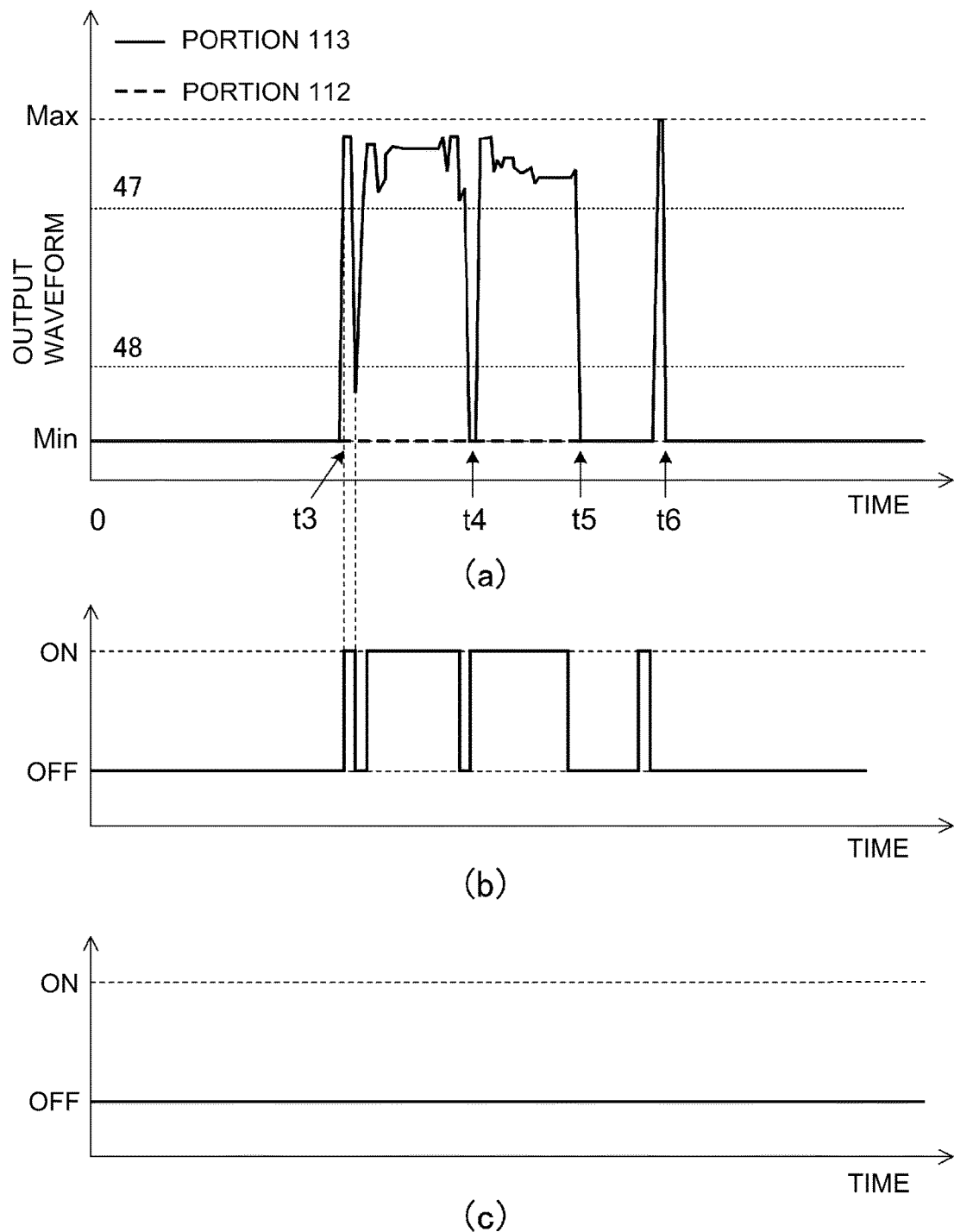
In FIG. 7, (a) is a schematic view showing an output signal during vibration of the sheet feeding intermediary plate, and (b) and (c) are schematic views each showing ON-OFF discrimination by a controller in a comparison example.
Figure 8:
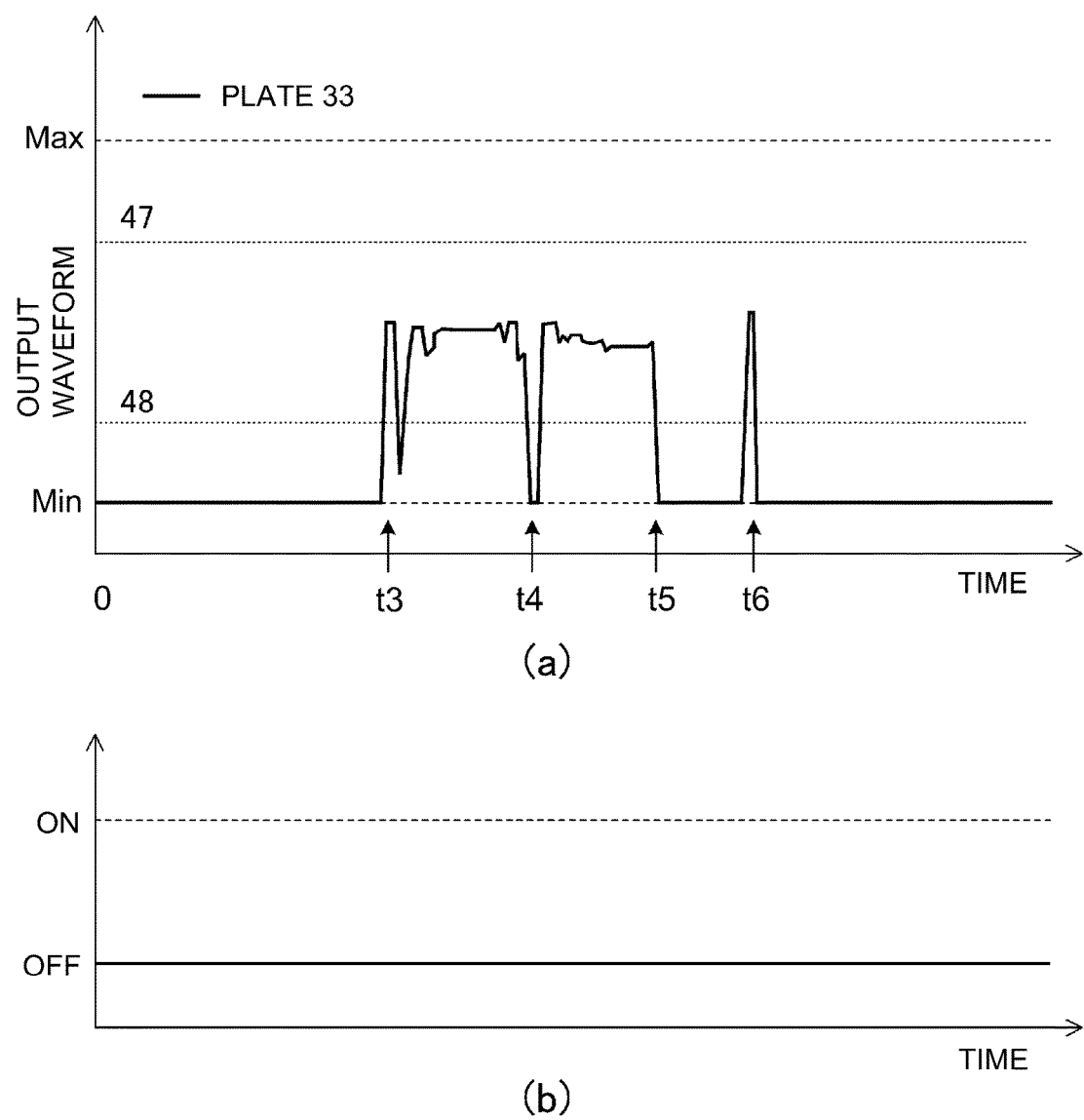
In FIG. 8, (a) is a schematic view showing an output signal during vibration of the sheet feeding intermediary plate, and (b) is a schematic view showing ON-OFF discrimination by the controller.

In FIG. 7, (a) is an illustration of an output waveform of the photo-interruptor 35 (FIG. 1) when the rotatable plate 107 in the comparison example stops in the state of (b) of FIG. 6 and then the sheet feeding operation starts in the case where the rotatable plate 107 is used in the multi-sheet feeding portion 17. Further, (a) of FIG. 7 also shows the output waveform when the optical axis 34 and the light-receiving portion 36 are completely light-blocked by the optical axis blocking portion 112 and the rotatable plate 107 stops. In FIG. 7, (b) is a schematic view for illustrating ON-OFF discrimination by the unshown controller in the output waveform in the state of (c) of FIG. 6. In FIG. 7, (c) is a schematic view for illustrating ON-OFF discrimination by the unshown controller in the output waveform at a position where the optical axis blocking portion 112 completely light-blocks the optical axis 34 and the light-receiving portion 36. In FIG. 8, (a) is an illustration of an output waveform of the photo-interruptor 35 (FIG. 1) when the rotatable plate 33 stops in the state of (c) of FIG. 6 and the sheet feeding operation starts in the case where the rotatable plate 33 in this embodiment is used in the rotary encoder 32. In FIG. 8, (b) is a schematic view for illustrating ON-OFF discrimination by the unshown controller in the output waveform in (a) of FIG. 8.

In (a) of FIG. 7, t3 shows timing when the uppermost paper Sa is urged against the feeding roller 18 by an upward operation (movement) of the sheet feeding intermediary plate 30 by the unshown spring in (a) of FIG. 6 in accordance with a sheet feeding start signal. In (a) of FIG. 7, t4 is timing when the feeding of the uppermost paper Sa starts, t3 is timing when the sheet feeding intermediary plate 30 is spaced from the feeding roller 18 by an unshown cam, and t6 is timing when contact of a trailing end of the uppermost paper Sa with the stacked sheet S is ended.

As shown in (a) of FIG. 6, in a state in which the number of the stacked sheets S is small, a self-weight of the sheets S applied from the lowermost paper Sb to the circumferential surface of the circumferential portion 38 of the rotatable plate 33 becomes small. Then, a force for impressing the rotation of the rotatable plate 33 becomes small, and therefore the rotatable plate 33 performs a rotation operation even when minute vibration generates.

First, when the above-described vibration is exerted on the rotatable plate 33, the output waveform of the photo-interruptor 35 and the ON-OFF discrimination by the unshown controller in the case where the rotatable plate 107 in the comparison example is used as the rotary encoder 32 will be described with reference to FIG. 7. Incidentally, it is assumed that the rotatable plate 107 stops in the state of (d) of FIG. 5 and then the state changes to a state close to the state of (b) of FIG. 6 and returns toward the state of (d) of FIG. 5 by being subjected to vibration during a subsequent sheet feeding operation. At the timing of the time t3, when a start signal of the feeding operation is sent, the sheet feeding intermediary plate 30 is raised toward the feeding roller 18 side by the unshown spring. At a place where the uppermost paper Sa contacts the feeding roller 18, the raising of the sheet feeding intermediary plate 30 stops. When the uppermost paper Sa contacts the feeding roller 18, the sheet feeding intermediary plate 30 vibrates due to impact. By this impact, also the rotatable plate 107 is subjected to the vibration and thus rotates. In the case where the vibration of the rotatable plate 107 generates in a state in which the rotatable plate 107 is at rest at the position of (b) of FIG. 6, an output waveform with an abrupt change as shown by a solid line in (a) of FIG. 7 is outputted by the photo-interruptor 35. The unshown controller makes discrimination of ON (state) since the output waveform of the photo-interruptor 35 increases and exceeds the first threshold 47 ((b) of FIG. 7). Thereafter, the output waveform lowers and is less than the second threshold 48, and therefore the controller makes discrimination of OFF (state). At the timing t4 when the feeding roller 18 starts the feeding of the uppermost paper Sa, the uppermost paper Sa moves by friction with the stacked sheet S, and the output waveform of the photo-interruptor 35 abruptly changes, so that the controller detects ON-OFF switching. Further, also at the timing t5 when the sheet feeding intermediary plate 30 is spaced from the feeding roller 18 by the unshown cam and at the timing t6 when contact of the trailing end of the uppermost paper Sa with the stacked sheet S is ended, the controller detects the switching from ON to OFF and the switching from OFF to ON, respectively. Thus, although the lowermost paper Sb is not fed, the controller makes the detection of the ON-OFF switching, and therefore, the controller erroneously discriminates that the final paper (lowermost paper) Sb was fed and stops the feeding operation.

Incidentally, in a state in which the optical axis 34 enters the optical axis blocking portion 112 and thus the light-receiving portion 36 is completely light-blocked, the output waveform is as shown by a broken line in (a) of FIG. 7. In the case where the rotatable plate 107 is subjected to the vibration by the feeding operation and rotates toward the first boundary portion 113 or the like, but rotates while the optical axis 34 enters the optical axis blocking portion 112 and does not reach the light-receiving portion 36, the output waveform from the photo-interruptor 35 is unchanged. For this reason, the unshown controller discriminates that the OFF state continues as shown in (c) of FIG. 7 and the sheets S are stacked on the sheet feeding intermediary plate 30, and continues the feeding operation.

Next, the output waveform of the photo-interruptor 35 and the ON-OFF discrimination by the unshown controller in the case where the rotatable plate 33 in this embodiment is used as the rotary encoder 32 will be described with reference to FIG. 8. Incidentally, it is assumed that the rotatable plate 33 stops in the state of (b) of FIG. 5 and then the state changes to a state close to the state of (c) of FIG. 6 and returns toward the state of (b) of FIG. 5 by being subjected to vibration during a subsequent sheet feeding operation. At the timing t3 when the sheet feeding intermediary plate 30 is raised and the uppermost paper Sa contacts the feeding roller 18, the output waveform and the ON-OFF discrimination are as follows. As described above with reference to FIG. 5, the shape of the first boundary portion 41 of the rotatable plate 33 has the slope, so that even when the rotatable plate 33 rotates in the same rotation amount as that of the rotatable plate 107 in which the output waveform exceeds the first threshold 47, the waveform outputted from the photo-interruptor 35 does not exceed the first threshold 47. Accordingly, the unshown controller makes discrimination of OFF (state) ((b) of FIG. 8). Also at the timings t4, t5 and t6, the output waveforms are similar to the output waveform at the timing t3, so that the controller continuously makes discrimination of OFF. For this reason, the controller is capable of continuously performing the feeding operation of subsequent sheets without stopping the feeding operation by making erroneous detection.

As described above, even in the case where the rotatable plate 33 minutely vibrates by the vibration of the sheet feeding intermediary plate 30, a change amount of the waveform outputted from the photo-interruptor 35 can be made smaller than that in the case where the rotatable plate 107 is used. Further, the two thresholds consisting of the first threshold 47 used when the output waveform of the photo-interruptor increases and the second threshold 48 used when the output waveform of the photo-interruptor 35 decreases are provided. For this reason, even when the rotatable plate 33 exhibits behavior such that the output waveform decreases after the output waveform exceeds the first threshold 47, there is a need to make the rotation amount larger than that in the comparison example until the output waveform is less than the second threshold 48. Accordingly, a margin against erroneous detection of the ON-OFF switching increases. Further, the output waveform of the photo-interruptor 35 becomes gentle, so that a degree of generation of abrupt ON-OFF switching can be reduced. For this reason, there is no need to perform mask operation (process) with FW for disregarding the abrupt ON-OFF switching.

Incidentally, in Embodiment 1, the shape of each of the first boundary portion 41 and the second boundary portion 42 which constitute the shape of the optical axis blocking portion 39 has the inclination angle of 60° with respect to the rectilinear line B connecting the rotation center 37 and the associated point of the circumferential portion 38, but this angle is not limited thereto. Further, in this embodiment, each of the first boundary portion 41 and the second boundary portion 42 of the optical axis transmitting portion 39 is provided with the slope relative to the rectilinear line B (FIG. 1), and the slit 36a of the light-receiving portion 36 has the rectangular shape having a long side along the substantially radial direction. The present invention is not limited to such a constitution, but may also employ a constitution in which the first and second boundary portions 41 and 42 are formed in a shape along the rectilinear line B and a slit shape of the light-receiving portion has a slope. Further, in this embodiment, the rotary encoder 32 was used for detecting the final paper at the multi-sheet feeding portion, but may also be used at another sheet feeding portion such as the cassette sheet feeding portion 13 or the like or used as a sheet detecting sensor by rotation detection.

Embodiment 2

Next, Embodiment 2 of the present invention will be described with reference to FIG. 9. A constitution of an image forming apparatus and a constitution and an operation of a multi-sheet feeding portion in this embodiment are similar to those in Embodiment 1, and the same reference numerals or symbols in FIG. 9 represent the same or corresponding portions.

Figure 9:
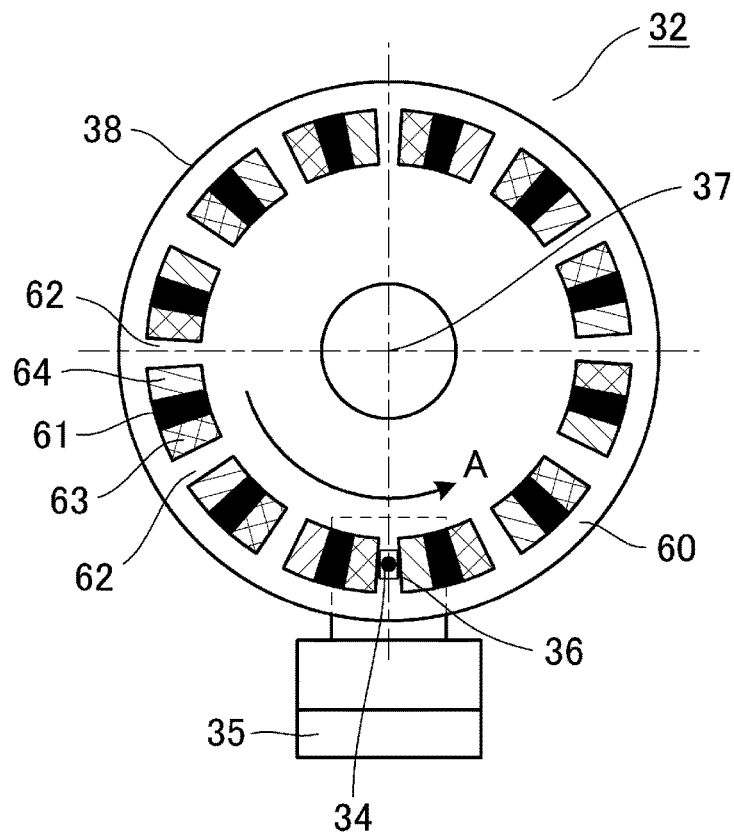
In FIG. 9, (a) and (b) are illustrations showing details of a rotatable plate in Embodiment 2.
Figure 9:
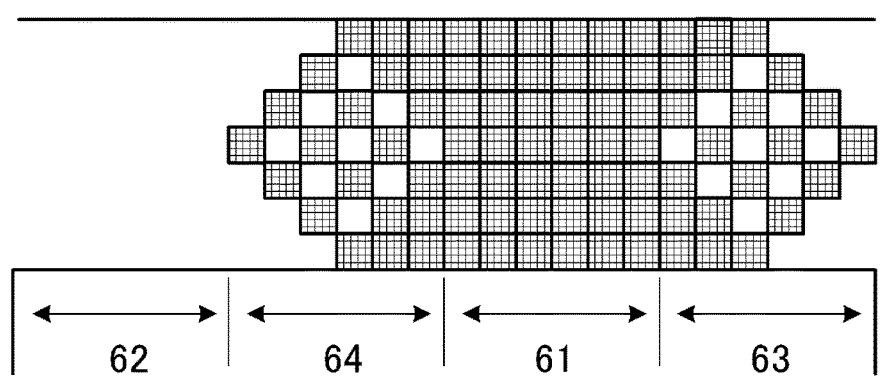

In FIG. 9, (a) and (b) are illustrations showing details of a rotatable plate 60 in a final paper detecting mechanism using a rotary encoder 32 which is a rotation detecting unit in the multi-sheet feeding portion 17. In FIG. 9, (a) shows a structure of the rotatable plate 60, and (b) shows details of a portion where the optical axis 34 passes through the rotatable plate 60. The rotatable plate 60 is processed by, e.g., a transparent material (first member) through which infrared rays pass, and is capable of transmission of the light emitted from the unshown light-emitting element so that the light-receiving portion 36 receives the light without substantially causing loss. The rotatable plate 60 includes an optical axis blocking portion (second portion-to-be-detected) 61 formed of a material second member) which blocks the infrared rays and which is colored, e.g., black, and is configured so that the light-receiving portion 36 cannot receive the light emitted from the light-emitting device. The rotatable plate 60 includes an optical axis transmitting portion (first portion-to-be-detected) 62 and a first boundary portion (third portion-to-be-detected) 63 through which the rotatable plate 60 switches from the optical axis transmitting portion 62 to the optical axis blocking portion 61 when rotates in the rotational direction A. The rotatable plate 60 further includes a second boundary portion (fourth portion-to-be-detected) 64 through which the rotatable plate 60 switches from the optical axis blocking portion 61 to the optical axis transmitting portion 62 when rotates in the rotational direction A. As shown in (b) of FIG. 9, the first boundary portion 61 is formed of a material (third member) which is colored so that the color gradually switches from transparence to the black. Further, the second boundary portion 64 is formed of a material (fourth member) which is colored so that the color gradually switches from the black to the transparence. A light transmittance at each of the first boundary portion 63 and the second boundary portion 64 is constituted so as to be larger than a light transmittance at the optical axis blocking portion 61.

Next, the waveform outputted from the photo-interruptor 35 when the rotatable plate 60 rotates relative to the optical axis 34 will be described. A method in which the multi-sheet feeding portion 17 starts the sheet feeding operation and the final paper detection is made is similar to that in Embodiment 1. During passing of the final paper Sb, when the rotatable plate 60 which is at rest at, e.g., the optical axis transmitting portion 62 starts rotation in the rotational direction A about the rotation center 37, the rotatable plate 60 passes through the optical axis 34 and the light-receiving portion 36 in the order of the first boundary portion 63, the optical axis blocking portion 61 and the second boundary portion 64. At this time, similarly as in FIG. 4 in Embodiment 1, the signal outputted from the photo-interruptor 35 is repetitively outputted in the order of the minimum received light signal 43, the first boundary signal 45, the maximum received light signal 44, the second boundary signal 46 and the minimum received light signal 43 in FIG. 4. Then, the unshown controller makes ON-OFF discrimination and thus detects rotation and non-rotation.

The first boundary portion 63 and the second boundary portion 64 in this embodiment are colored so that the color gradually switches from the transparence to the black and from the black to the transparence, respectively. Different from the rotatable plate 107 in the comparison example, the boundary portions do not have the rectilinear line shape but change with certain angles so that the rotatable plate 60 rotates in the order of the optical axis blocking portion 61 to the optical axis transmitting portion 62 or in the order of the optical axis transmitting portion 62 to the optical axis blocking portion 61, through the associated boundary portion. Therefore, it becomes possible to make the slopes of the first boundary signal 45 and the second boundary signal 46 in FIG. 4 gentle. Accordingly, as shown in (a) of FIG. 5, the rotatable plate 60 can rotate for a longer time than the time t1 required from the minimum output to the maximum output for the rotatable plate 107 in the comparison example. For this reason, as shown in FIG. 6, even in the case where the vibration is applied to the multi-sheet feeding portion 17, it becomes possible to reduce a probability of erroneous detection.

In this embodiment, as the material of the rotatable plate 60, the transparent material was used, but is not limited to the transparent material when the material is capable of transmission of the light emitted from the light-emitting device. Further, in this embodiment, the optical axis blocking portion 61 was colored black, but may only be required to block the light, so that also the colors of the first boundary portion 63 and the second boundary portion 64 can be changed correspondingly. Further, as shown in (b) of FIG. 9, the boundary portions are colored black, but the coloring pattern is not limited thereto. Further, in this embodiment, as the material of the rotatable plate 60, the transparent material is used, but the material is not limited thereto. For example, a constitution in which as the material of the rotatable plate 60, a material (first member) such as a resin material through which the infrared rays do not pass, and the optical axis transmitting portion 62 is provided with holes so that the holes are formed in a shape, e.g., as shown in (b) of FIG. 9 such that the light is gradually blocked or gradually passes may also be employed.

Embodiment 3

Next, Embodiment 3 of the present invention will be described with reference to FIGS. 10, 11 and 12. A constitution of an image forming apparatus and a constitution and an operation of a multi-sheet feeding portion in this embodiment are similar to those in Embodiment 1, and the same reference numerals or symbols in FIGS. 10, 11 and 12 represent the same or corresponding portions.

Figure 10:
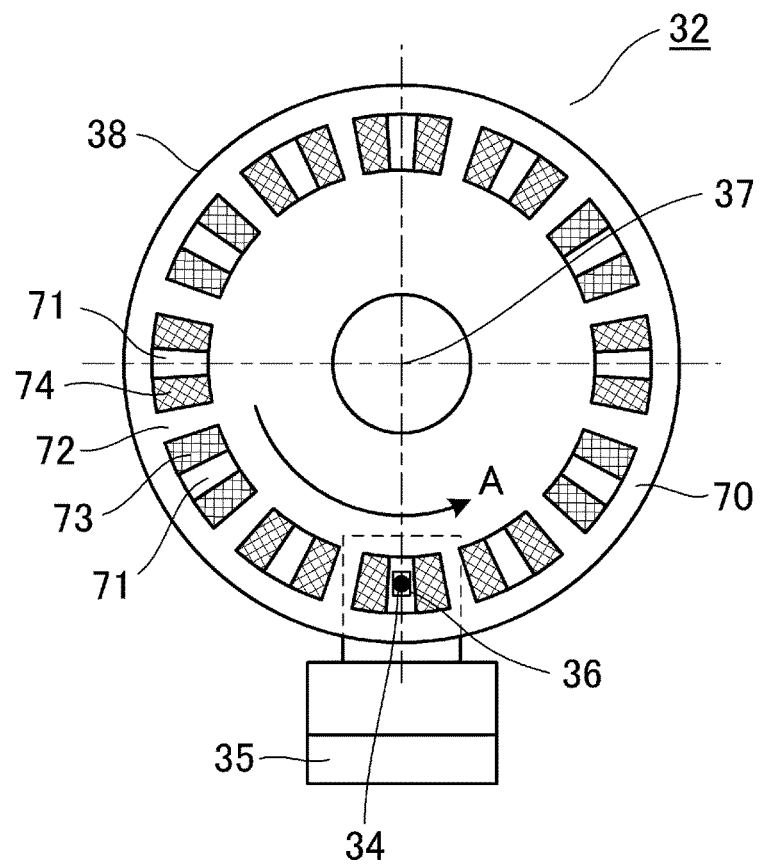
In FIG. 10, (a) and (b) are illustrations showing details of a rotatable plate in Embodiment 3.
Figure 10:
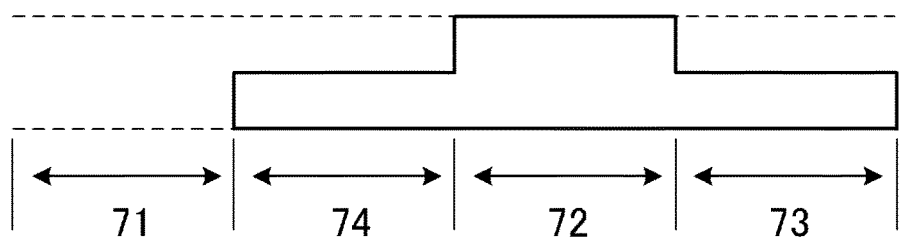

In FIG. 10, (a) and (b) are illustrations showing details of a rotatable plate 70 in a final paper detecting mechanism using a rotary encoder 32 which is a rotation detecting unit in the multi-sheet feeding portion 17. In FIG. 10, (a) shows a structure of the rotatable plate 70, and (b) shows details of a thickness of a portion where the optical axis 34 passes through the rotatable plate 70. In FIG. 11, (a) is an illustration showing an output waveform outputted from the photo-interruptor 35, and (b) is an illustration showing ON-OFF discrimination by the unshown controller.

The rotatable plate 70 includes an optical axis transmitting portion (first portion-to-be-detected) 71 having a hole shape through which the infrared rays pass. The rotatable plate 70 includes an optical axis blocking portion (second portion-to-be-detected) 72 and a first boundary portion (third portion-to-be-detected) 73 through which the rotatable plate 70 switches from the optical axis transmitting portion 71 to the optical axis blocking portion 72 when rotates in the rotational direction A. The rotatable plate 70 further includes a second boundary portion (fourth portion-to-be-detected) 74 through which the rotatable plate 70 switches from the optical axis blocking portion 72 to the optical axis transmitting portion 71 when rotates in the rotational direction A. The rotatable plate 70 is constituted by members different in thickness with respect to an axial direction depending on the respective portions. That is, the third member constituting the first boundary portion 73 and the fourth member constituting the second boundary portion 74 are constituted by the material having a larger light transmittance than the second member constituting the optical axis blocking portion 72. As shown in (b) of FIG. 10, both of the first boundary portion 73 and the second boundary portion 74 and thinner than the optical axis blocking portion 72, and the output waveform of the photo-interruptor 35 shown in (a) of FIG. 11 changes between the minimum received light waveform 43 (FIG. 11) and the maximum received light waveform 44 (FIG. 11).

Figure 11:
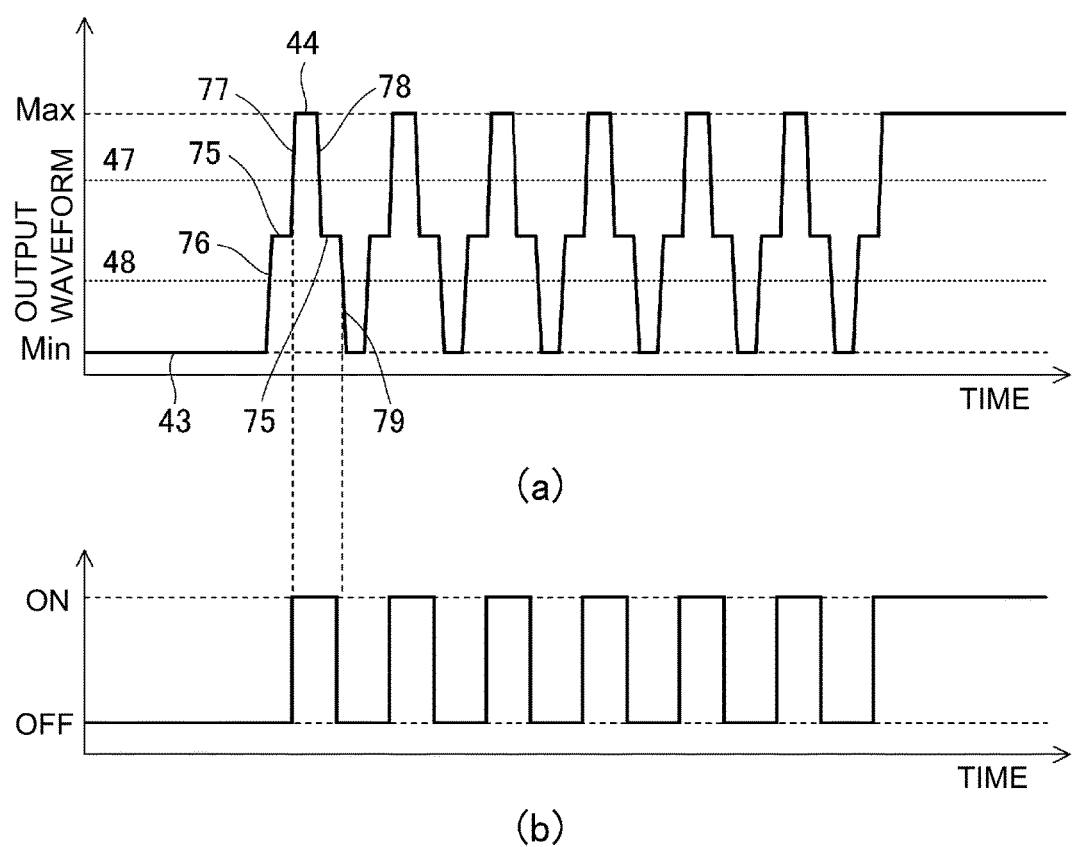
In FIG. 11, (a) and (b) are illustrations showing details of an output waveform in Embodiment 3.
Figure 12:
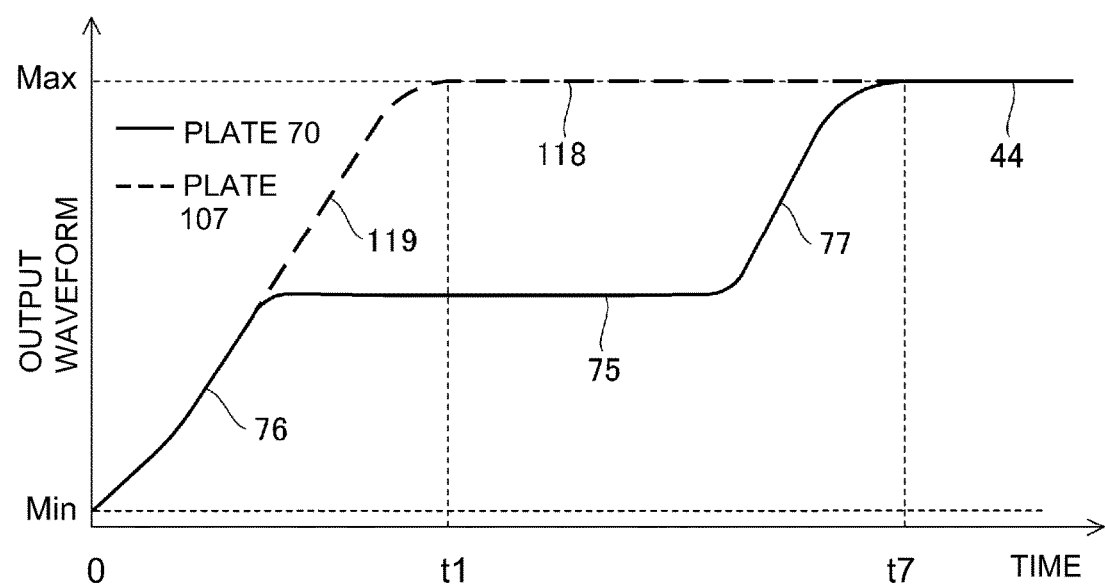
FIG. 12 is a graph showing an output waveform of a photo-interruptor in the case where rotatable plates rotate at the same speed.

With reference to FIG. 11, the output waveform from the photo-interruptor 35 in this embodiment will be described. A minimum received light output 43 is an output when the optical axis blocking portion 72 light-blocks the optical axis 34 and the received light quantity of the light-receiving portion 36 is a minimum. A maximum received light output 44 is an output when the optical axis transmitting portion 71 transmits the optical axis 34 and the received light quantity of the light-receiving portion 36 is a maximum. In intermediary output 75 is an output at the first boundary portion 73 and at the second boundary portion 74, and a first increasing output 76 and a second increasing output 77 are outputs when the output waveform increases. Further, a first decreasing output 78 and a second decreasing output 79 are outputs when the output waveform decreases. That is, the received light quantity of the light-receiving portion 36 stepwisely increases and decreases. A first threshold 47 and a second threshold 48 are the following values. When the output waveform from the photo-interruptor 35 increases and exceeds the intermediary output 75 and provides the second increasing output 77, the first threshold 47 is the value for which the unshown controller makes discrimination of ON (state) in the case where the output exceeds the first threshold 47 and makes discrimination of OFF (state) in the case where the output does not exceed the first threshold 47. When the output waveform of the photo-interruptor 35 decreases and is less than the intermediary output 75 and provides the second decreasing output 79, the second threshold is set at the value for which the unshown controller makes discrimination of OFF in the case where the output is less than the second threshold 48 and makes discrimination of ON in the case where the output is not less than the second threshold 48.

FIG. 12 is a graph showing the output waveform when the rotatable plate 70 in FIG. 10 rotates in the rotational direction A form the optical axis transmitting portion 71 to the optical axis blocking portion 72 through the first boundary portion 73 relative to the optical axis 34. With reference to FIG. 12, as a feature of the constitution in this embodiment, a relationship between the optical axis blocking portion 72 of the rotatable plate 70 and the output waveform will be described in comparison with the case where the rotatable plate 107 (FIG. 14) in the comparison example is used. In the graph of FIG. 12, a solid line represents the output waveform when the rotatable plate 70 is used, and a broken line represents the output waveform when the rotatable plate 107 (FIG. 14) in the comparison example is used. In FIG. 12, t7 is a time of rotation of the rotatable plate 70 from the optical axis blocking portion 72 to the optical axis transmitting portion 71 through the first boundary portion 74.

When the rotatable plate 70 and the rotatable plate 107 rotate in the rotational direction at the same speed, a time of rotation of the rotatable plate 107 from the optical axis blocking portion 112 shown in (d) of FIG. 5 to the optical axis transmitting portion 111 shown in (e) of FIG. 5 through the first boundary portion 113 is t1. On the other hand, after a lapse of t1, the rotatable plate 70 is positioned at the first boundary portion 73 and the output waveform is in a state of the intermediary output 75. In order to rotate the rotatable plate 70 to the optical axis transmitting portion 71, it takes a time of t7. The boundary portions of the rotatable plate 107 in the comparison example have the rectilinear line shape, and on the other hand, the rotatable plate 70 includes angular regions, such as the first boundary portion 73 and the second boundary portion 74, where the intermediary waveform 75 is outputted.

Accordingly, as shown in FIG. 12, the rotatable plate 70 can rotate for a longer time than the time t1 required from the minimum output to the maximum output for the rotatable plate 107 in the comparison example. That is, when compared in the case where the rotatable plate 70 and the rotatable plate 107 rotate at the same speed at the boundary portion, such as the boundary portion between the optical axis transmitting portion 71 and the optical axis blocking portion 72, where the output waveform of the photo-interruptor 35 changes, a degree of the change in output of the photo-interruptor 35 can be decreased. For this reason, even in the case where the vibration is applied to the multi-sheet feeding portion 17, it becomes possible to reduce a probability of erroneous detection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-180045 filed on Sep. 11, 2015, which is hereby incorporated by reference herein in its entirety.

What is claimed is:

1. A rotation detecting unit comprising:
   a light emitting device for emitting light;
   a light receiving device for receiving the light;
   an output device for outputting an output waveform changing depending on a received light quantity of said light receiving device;
   a rotatable plate, rotatably supported by a shaft, for being irradiated with the light emitted from said light emitting device and entering said light receiving device; and
   a discriminating device for discriminating a state of said rotatable plate on the basis of the output waveform of said output device,
   wherein said rotatable plate includes a first portion and a second portion which are alternately provided along a circumferential direction, a third portion provided between said first portion and said second portion with respect to the circumferential direction, and a fourth portion provided between said second portion and said first portion with respect to the circumferential direction,
   wherein when a region of said first portion is irradiated with the light emitted from said light emitting device and received by said light receiving device, the received light quantity of said light receiving device is a maximum,
   when a region of said second portion is irradiated with the light emitted from said light emitting device and received by said light receiving device, the received light quantity of said light receiving device is a minimum, and
   wherein when said third portion or said fourth portion is irradiated with the light emitted from said light emitting device and received by said light receiving device, the received light quantity of said light receiving device is larger than the minimum and is smaller than the maximum.

2. A rotation detecting unit according to claim 1, wherein when said rotatable plate rotates from a state in which said first portion is irradiated with the light emitted from said light emitting device and received by said light receiving device toward a state in which said second portion is irradiated with the light emitted from said light emitting device and received by said light receiving device, in a state in which said third portion is irradiated with the light emitted from said light emitting device and received by said light receiving device, the received light quantity of said light receiving device gradually decreases from the maximum toward the minimum.

3. A rotation detecting unit according to claim 2, wherein said light receiving device includes light receiving region limiting means, having an output which opens toward said light emitting device, for limiting the light received by said light receiving device to light with which a region of the output is irradiated,
   wherein said rotatable plate includes an output portion penetrating in an axial direction and a light blocking portion for blocking the light emitted from said light emitting device and to be received by said light receiving device,
   wherein said first portion includes said output portion,
   wherein said second portion includes said light blocking portion,
   wherein said third portion include said output portion and said light blocking portion, and
   wherein when said rotatable plate rotates from the state in which said first portion is irradiated with the light toward the state in which said second portion is irradiated with the light, a proportion of an area occupied by said light blocking portion to an area occupied by said output portion in the output of said light receiving region limiting means gradually increases.

4. A rotation detecting unit according to claim 3, wherein when said rotatable plate rotates from the state in which said first portion is irradiated with the light toward the state in which said second portion is irradiated with the light, a boundary portion between said output portion and said light blocking portion in said third portion obliquely crosses an edge portion of the output of said light receiving region limiting means.

5. A rotation detecting unit according to claim 4, wherein the boundary portion between said output portion and said light blocking portion in said third portion extends obliquely with respect to a radial direction of said rotatable plate.

6. A rotation detecting unit according to claim 4, wherein the boundary portion between said output portion and said light blocking portion in said third portion extends along a radial direction of said rotatable plate.

7. A rotation detecting unit according to claim 1, wherein when said rotatable plate rotates from a state in which said second portion is irradiated with the light emitted from said light emitting device and received by said light receiving device toward a state in which said first portion is irradiated with the light emitted from said light emitting device and received by said light receiving device, in a state in which said fourth portion is irradiated with the light emitted from said light emitting device and received by said light receiving device, the received light quantity of said light receiving device gradually increases from the minimum toward the maximum.

8. A rotation detecting unit according to claim 7, wherein said light receiving device includes light receiving region limiting means, having an output which opens toward said light emitting device, for limiting the light received by said light receiving device to light with which a region of the output is irradiated, wherein said rotatable plate includes an output portion penetrating in an axial direction and a light blocking portion for blocking the light emitted from said light emitting device and to be received by said light receiving device, wherein said first portion includes said output portion, wherein said second portion includes said light blocking portion, wherein said fourth portion include said output portion and said light blocking portion, and wherein when said rotatable plate rotates from the state in which said second portion is irradiated with the light toward the state in which said first portion is irradiated with the light, a proportion of an area occupied by said light blocking portion to an area occupied by said output portion in the output of said light receiving region limiting means gradually decreases.

9. A rotation detecting unit according to claim 8, wherein when said rotatable plate rotates from the state in which said second portion is irradiated with the light toward the state in which said first portion is irradiated with the light, a boundary portion between said light blocking portion and said output portion in said fourth portion obliquely crosses an edge portion of the output of said light receiving region limiting means.

10. A rotation detecting unit according to claim 9, wherein the boundary portion between said light blocking portion and said output portion in said fourth portion extends obliquely with respect to a radial direction of said rotatable plate.

11. A rotation detecting unit according to claim 9, wherein the boundary portion between said light blocking portion and said output portion in said fourth portion extends along a radial direction of said rotatable plate.

12. A rotation detecting unit according to claim 1, wherein when said rotatable plate rotates from a state in which said first portion is irradiated with the light emitted from said light emitting device and received by said light receiving device toward a state in which said second portion is irradiated with the light emitted from said light emitting device and received by said light receiving device, in a state in which said third portion is irradiated with the light emitted from said light emitting device and received by said light receiving device, the received light quantity of said light receiving device stepwise decreases from the maximum toward the minimum.

13. A rotation detecting unit according to claim 1, wherein when said rotatable plate rotates from a state in which said second portion is irradiated with the light emitted from said light emitting device and received by said light receiving device toward a state in which said first portion is irradiated with the light emitted from said light emitting device and received by said light receiving device, in a state in which said fourth portion is irradiated with the light emitted from said light emitting device and received by said light receiving device, the received light quantity of said light receiving device stepwise increases from the minimum toward the maximum.

14. A rotation detecting unit according to claim 1, wherein said first portion includes an output portion penetrating in an axial direction, wherein said second portion, said third portion and said fourth portion are formed of a member so that a thickness of the member is thickest at said second portion and is thinner at said third portion and said fourth portion than at said second portion.

15. A rotation detecting unit according to claim 1, wherein said first portion includes an output portion penetrating in an axial direction, wherein said second portion, said third portion and said fourth portion are formed of a second member, a third member and a fourth member, respectively, and wherein a light transmittance of each of the third member and the fourth member is larger than a light transmittance of the second member.

16. A rotation detecting unit according to claim 1, wherein said first portion, said second portion, said third portion and said fourth portion are formed of a first member, a second member, a third member and a fourth member, respectively, and wherein a light transmittance of each of the third member and the fourth member is smaller than a light transmittance of the first member and is larger than the first member.

17. A sheet feeding device comprising:

a sheet stacking portion for stacking sheets;

sheet feeding means for feeding the sheets stacked on said sheet stacking portion;

stacking portion moving means for moving said sheet stacking portion so that an uppermost sheet of the sheets is urged against said sheet feeding means at timing when the sheet is fed and so that the uppermost sheet is spaced from said sheet feeding means at timing other than the timing when the sheet is fed; and a rotation detecting unit according to claim 1 for detecting movement of a lowermost sheet of the sheets by causing a peripheral surface of said rotatable plate to contact a surface of the lowermost sheet.

18. An image forming apparatus comprising:

a sheet feeding device according to claim 17; and image forming means for forming an image on the sheet fed from said sheet feeding device.

* * * * *